(12) United States Patent
Chu

(10) Patent No.: US 11,495,048 B2
(45) Date of Patent: Nov. 8, 2022

(54) FINGERPRINT SENSING MODULE

(71) Applicant: Au Optronics Corporation, Hsinchu (TW)

(72) Inventor: Hsun-Chen Chu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/364,889

(22) Filed: Jul. 1, 2021

(65) Prior Publication Data

US 2022/0050990 A1  Feb. 17, 2022

Related U.S. Application Data

(60) Provisional application No. 63/066,416, filed on Aug. 17, 2020.

(30) Foreign Application Priority Data

Apr. 6, 2021 (TW) ................................ 110112455

(51) Int. Cl.
*H04N 5/335* (2011.01)
*G06V 40/13* (2022.01)
(Continued)

(52) U.S. Cl.
CPC ...... *G06V 40/1318* (2022.01); *G02F 1/13338* (2013.01); *G02F 1/133512* (2013.01); *G02F 1/133514* (2013.01)

(58) Field of Classification Search
CPC ............ G06V 40/1318; G02F 1/13338; G02F 1/133512; G02F 1/133514; H01L 27/14818
(Continued)

(56) References Cited

U.S. PATENT DOCUMENTS 10,425,624 B2  9/2019  Honda
10,685,998 B2  6/2020  Asatsuma
(Continued)

FOREIGN PATENT DOCUMENTS

CN  102375334  4/2014
CN  107615485  1/2018

*Primary Examiner* — Abdul-Samad A Adediran
(74) *Attorney, Agent, or Firm* — JCIPRNET

(57) ABSTRACT

A fingerprint sensing module, including a photosensitive element layer and a color filter layer, is provided. The photosensitive element layer has multiple photosensitive regions, and includes a substrate and multiple photosensitive pixels. The photosensitive pixels have multiple photosensitive patterns overlapping the photosensitive regions. The photosensitive pixels include multiple first photosensitive pixels overlapping multiple first photosensitive regions and multiple second photosensitive pixels overlapping multiple second photosensitive regions. A percentage value of a number of the second photosensitive pixels to a number of the photosensitive pixels is less than 30%. An orthographic projection area of each of the first photosensitive regions is different from an orthographic projection area of each of the second photosensitive regions. The color filter layer has multiple openings overlapping the first photosensitive pixels and multiple first color filter patterns overlapping the second photosensitive pixels.

20 Claims, 18 Drawing Sheets

(51) Int. Cl.
   *G02F 1/1333*   (2006.01)
   *G02F 1/1335*   (2006.01)
(58) Field of Classification Search
   USPC ..................................................... 257/31.122
   See application file for complete search history.

(56) References Cited

U.S. PATENT DOCUMENTS

| | | | |
|---|---|---|---|
| 2005/0062863 A1* | 3/2005 | Takeuchi | H01L 27/14818 |
| | | | 257/E31.122 |
| 2012/0043634 A1 | 2/2012 | Kurihara | |
| 2018/0302597 A1 | 10/2018 | Honda | |

* cited by examiner

FINGERPRINT SENSING MODULE

CROSS-REFERENCE TO RELATED APPLICATION

This application claims the priority benefit of Taiwan application serial no. 110112455, filed on Apr. 6, 2021, and the priority benefit of U.S. provisional application. 63/066,416, filed on Aug. 17, 2020. The entirety of the abovementioned patent applications are hereby incorporated by reference herein and made a part of this specification.

BACKGROUND

Technical Field

This disclosure relates to an optical module, and in particular to a fingerprint sensing module.

Description of Related Art

In order to increase a screen-to-body ratio of a display to realize a narrow bezel design, under-screen fingerprint sensing technology has become a trend. Simply put, the under-screen fingerprint sensing technology is configuring a fingerprint sensing module underneath a display panel of an electronic device. After the electronic device detects that a user touches the display screen, the electronic device controls the display panel to emit light to illuminate a surface of a finger of the user. A ray may be (diffuse) reflected by the finger of the user into the fingerprint sensing module underneath the display panel, and the reflected ray may be converted into a digital image signal by the fingerprint sensing module, so as to obtain a fingerprint image of the user.

However, in the fingerprint sensing module, quantum efficiency (QE %) of a photosensitive material that is used to convert the ray into an electrical signal is different at different wavelength ranges. Therefore, magnitude of a photocurrent generated by the photosensitive material when irradiated by different colored lights are significantly different, resulting in different photosensitive pixels having the same structural design to have different sensing sensitivity for the different colored lights, which affects the overall image sensing quality.

SUMMARY

This disclosure provides a fingerprint sensing module, in which a sensing sensitivity difference of each photosensitive pixel is small.

The fingerprint sensing module of the disclosure includes a photosensitive element layer and a color filter layer. The color filter layer is disposed on the photosensitive element layer. The photosensitive element layer has multiple photosensitive regions, and includes a substrate and multiple photosensitive pixels. The photosensitive pixels are disposed between the color filter layer and the substrate, and have multiple photosensitive patterns overlapping the photosensitive regions. The photosensitive pixels include multiple first photosensitive pixels and multiple second photosensitive pixels. The first photosensitive pixels overlap multiple first photosensitive regions of the photosensitive regions. The second photosensitive pixels overlap multiple second photosensitive regions of the photosensitive regions. A percentage value of a number of the second photosensitive pixels to a number of the photosensitive pixels is less than 30%, and an orthographic projection area of each of the first photosensitive regions on the substrate is different from an orthographic projection area of each of the second photosensitive regions on the substrate. The color filter layer has multiple openings and multiple first color filter patterns. The openings respectively overlap the first photosensitive pixels. The first color filter patterns respectively overlap the second photosensitive pixels.

In an embodiment of the disclosure, quantum efficiency of the multiple photosensitive patterns of the fingerprint sensing module for a first colored light passing through the multiple openings is different from quantum efficiency of the photosensitive patterns for a second colored light passing through the multiple first color filter patterns.

In an embodiment of the disclosure, the quantum efficiency of the multiple photosensitive patterns of the fingerprint sensing module for the first colored light is greater than the quantum efficiency of the photosensitive patterns for the second colored light, and the orthographic projection area of each of the first photosensitive regions on the substrate is smaller than the orthographic projection area of each of the second photosensitive regions on the substrate.

In an embodiment of the disclosure, the multiple photosensitive pixels of the fingerprint sensing module further include multiple third photosensitive pixels. The third photosensitive pixels overlap multiple third photosensitive regions of the multiple photosensitive regions. A percentage value of a sum of numbers of the second photosensitive pixels and the third photosensitive pixels to the number of the photosensitive pixels is less than 30%. The color filter layer also has multiple second color filter patterns respectively overlapping the third photosensitive pixels, and quantum efficiency of the photosensitive patterns for a third colored light passing through the second color filter patterns is different from the quantum efficiency of the photosensitive patterns for the first colored light and the quantum efficiency of the photosensitive patterns for the second colored light.

In an embodiment of the disclosure, the quantum efficiency of the multiple photosensitive patterns of the fingerprint sensing module for the first colored light is greater than the quantum efficiency of the photosensitive patterns for the second colored light. The quantum efficiency of the photosensitive patterns for the second colored light is greater than the quantum efficiency of the photosensitive patterns for the third colored light. The orthographic projection area of each of the first photosensitive regions on the substrate is smaller than the orthographic projection area of each of the second photosensitive regions on the substrate, and the orthographic projection area of each of the second photosensitive regions on the substrate is smaller than an orthographic projection area of each of the third photosensitive regions on the substrate.

In an embodiment of the disclosure, the fingerprint sensing module further includes a light shielding pattern layer, which is disposed on the multiple photosensitive patterns and defines the multiple photosensitive regions. The light shielding pattern layer includes multiple first openings and multiple second openings overlapping at least a portion of the photosensitive patterns. The first openings overlap the multiple first photosensitive pixels. The second openings overlap the multiple second photosensitive pixels, and an orthographic projection area of a region occupied by each of the first openings on the substrate is different from an orthographic projection area of a region occupied by each of the second openings on the substrate.

In an embodiment of the disclosure, the quantum efficiency of the multiple photosensitive patterns of the fingerprint sensing module for the first colored light is greater than the quantum efficiency of the photosensitive patterns for the second colored light, and the orthographic projection area of the region occupied by each of the first openings on the substrate is smaller than the orthographic projection area of the region occupied by each of the second openings on the substrate.

In an embodiment of the disclosure, an insulation layer is disposed between the light shielding pattern layer and the multiple photosensitive patterns of the fingerprint sensing module.

In an embodiment of the disclosure, the multiple first photosensitive pixels of the fingerprint sensing module have multiple first photosensitive patterns in the multiple photosensitive patterns. The multiple second photosensitive pixels have multiple second photosensitive patterns in the photosensitive patterns, and an orthographic projection area of each of the first photosensitive patterns on the substrate is different from an orthographic projection area of each of the second photosensitive patterns on the substrate.

In an embodiment of the disclosure, quantum efficiency of the photosensitive patterns of the fingerprint sensing module for a first colored light passing through the multiple openings is greater than quantum efficiency of the photosensitive patterns for a second colored light passing through the multiple first color filter patterns, and the orthographic projection area of each of the first photosensitive patterns on the substrate is smaller than the orthographic projection area of each of the second photosensitive patterns on the substrate.

In an embodiment of the disclosure, each of the photosensitive pixels of the fingerprint sensing module further has a first electrode, a second electrode, and a conductive pattern. The first electrode and the second electrode are respectively disposed on two opposite sides of a corresponding photosensitive pattern and are electrically connected to the photosensitive pattern. The first electrode overlaps the conductive pattern and is located between the photosensitive pattern and the conductive pattern. The first electrode is electrically insulated from the conductive pattern. An orthographic projection area of the conductive pattern of each of the first photosensitive pixels on the substrate is different from an orthographic projection area of the conductive pattern of each of the second photosensitive pixels on the substrate.

In an embodiment of the disclosure, quantum efficiency of the photosensitive patterns of the fingerprint sensing module for a first colored light passing through the multiple openings is greater than quantum efficiency of the photosensitive patterns for a second colored light passing the multiple first color filter patterns, and the orthographic projection area of the conductive pattern of each of the first photosensitive pixels on the substrate is larger than the orthographic projection area of the conductive pattern of each of the second photosensitive pixels on the substrate.

In an embodiment of the disclosure, the orthographic projection area of each of the first photosensitive regions of the fingerprint sensing module on the substrate is smaller than the orthographic projection area of each of the second photosensitive regions on the substrate.

In an embodiment of the disclosure, the fingerprint sensing module further includes multiple infrared light cut-off filter patterns, which are disposed in the multiple openings of the color filter layer, and respectively overlap the multiple first photosensitive pixels.

The disclosure provides a fingerprint sensing module in which the sensing sensitivity difference of each of the photosensitive pixels is small.

The fingerprint sensing module of the disclosure includes a photosensitive element layer and a color filter layer. The color filter layer is disposed on the photosensitive element layer. The photosensitive element layer has multiple photosensitive regions, and includes a substrate and multiple photosensitive pixels. The photosensitive pixels are disposed on the substrate, and each of the photosensitive pixels has a photosensitive pattern, a first electrode, a second electrode, and a conductive pattern overlapping one of the photosensitive regions. The first electrode and the second electrode are respectively disposed on two opposite sides of the photosensitive pattern and electrically connected to the photosensitive pattern. The first electrode is located between the photosensitive pattern and the conductive pattern, and overlaps the conductive pattern to form a storage capacitor. The photosensitive pixels include multiple first photosensitive pixels and multiple second photosensitive pixels. The photosensitive pixels are located between the color filter layer and the substrate. The color filter layer has multiple openings and multiple first color filter patterns. The openings respectively overlap the first photosensitive pixels. The first color filter patterns respectively overlap the second photosensitive pixels. Quantum efficiency of the photosensitive patterns for a first colored light passing through the openings is different from quantum efficiency of the photosensitive patterns for a second colored light passing through the first color filter patterns, and an orthographic projection area of the conductive pattern of each of the first photosensitive pixels on the substrate is different from an orthographic projection area of the conductive pattern of each of the second photosensitive pixels on the substrate.

In an embodiment of the disclosure, the quantum efficiency of the multiple photosensitive patterns of the fingerprint sensing module for the first colored light is greater than the quantum efficiency of the photosensitive patterns for the second colored light. The orthographic projection area of the conductive pattern of each of the first photosensitive pixels on the substrate is larger than the orthographic projection area of the conductive pattern of each of the second photosensitive pixels on the substrate. The multiple photosensitive regions include multiple first photosensitive regions overlapping the first photosensitive pixels and multiple second photosensitive regions overlapping the second photosensitive pixels. An orthographic projection area of each of the first photosensitive regions on the substrate is equal to an orthographic projection area of each of the second photosensitive regions on the substrate.

In an embodiment of the disclosure, the multiple photosensitive regions of the fingerprint sensing module includes multiple first photosensitive regions overlapping the multiple first photosensitive pixels and multiple second photosensitive regions overlapping the multiple second photosensitive pixels. An orthographic projection area of each of the first photosensitive regions on the substrate is different from an orthographic projection area of each of the second photosensitive regions on the substrate.

In an embodiment of the disclosure, the quantum efficiency of the multiple photosensitive patterns of the fingerprint sensing module for the first colored light is greater than the quantum efficiency of the multiple photosensitive patterns for the second colored light. The orthographic projection area of each of the first photosensitive regions on the substrate is smaller than the orthographic projection area of each of the second photosensitive regions on the substrate.

The orthographic projection area of the conductive pattern of each of the first photosensitive pixels on the substrate is larger than the orthographic projection area of the conductive pattern of each of the second photosensitive pixels on the substrate.

In an embodiment of the disclosure, a percentage value of a number of the second photosensitive pixels of the fingerprint sensing module to a number of the photosensitive pixels is less than 30%.

In an embodiment of the disclosure, the fingerprint sensing module further includes multiple infrared light cut-off filter patterns, which are disposed in the multiple openings of the color filter layer, and respectively overlap the multiple first photosensitive pixels.

Based on the above, in the fingerprint sensing module according to the embodiment of the disclosure, the first photosensitive pixels and the second photosensitive pixels used to sense the different colored lights have a smaller difference in the sensing sensitivity due to the different sizes of their respective photosensitive regions or the different storage capacitance values. Accordingly, the image sensing quality of the fingerprint sensing module is improved.

To make the abovementioned more comprehensible, several embodiments accompanied by drawings are described in detail as follows.

DESCRIPTION OF THE EMBODIMENTS

Figure 1:
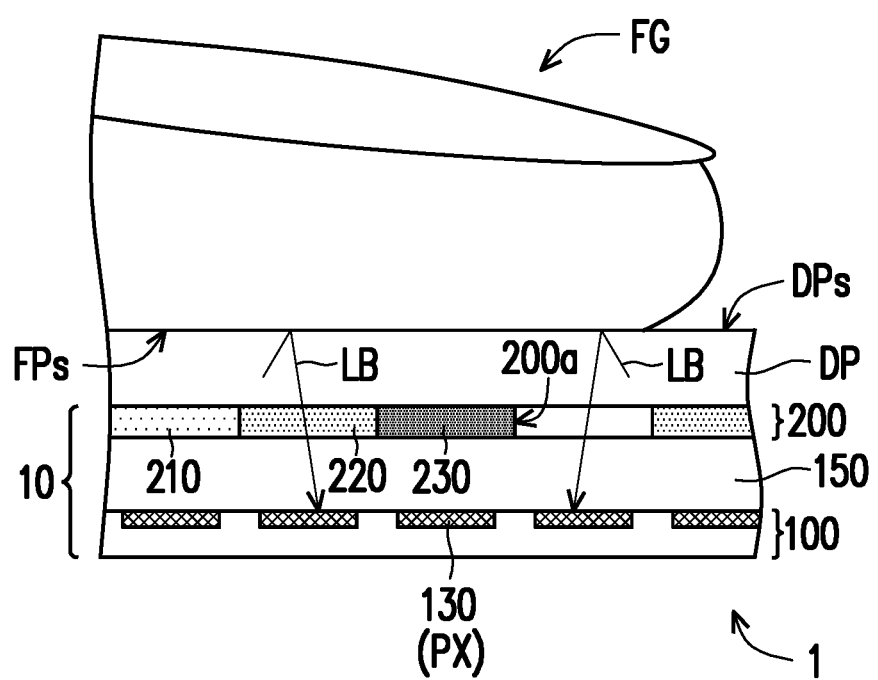
FIG. 1 is a schematic view of a fingerprint recognition device according to a first embodiment of the disclosure.

Terms such as "about", "approximately", "intrinsically", or "substantially" used in this text includes a stated value and an average value within an acceptable deviation range of a specific value determined by a person of ordinary skill in the art, taking into consideration the discussed measurement and a specific number of errors associated with the measurement (that is, limitations of the measurement system). For example, "about" may mean within one or more standard deviations of the stated value, or, for example, within ±30%, ±20%, ±15%, ±10%, ±5%. Furthermore, the terms "about", "approximately", "intrinsically", or "substantially" used in the text may select a more acceptable deviation range or standard deviation according to measurement properties, cutting properties, or other properties, where not one standard deviation is applicable to all properties.

In the drawings, thicknesses of layers, films, panels, regions, etc., are exaggerated for clarity. It should be understood that when an element such as a layer, film, region, or substrate is referred to as being "on" or "connected to" another element, it may be directly on or connected to the other element, or there may also be intermediate elements present. In contrast, when an element is referred to as being "directly on" or "directly connected to" another element, no intermediate elements exist. As used herein, "connection" may refer to physical and/or electrical connection. Furthermore, "electrical connection" may mean that there are other elements between the two elements.

Reference is now made in detail to exemplary embodiments of the disclosure, and examples of the exemplary embodiments are illustrated in the accompanying drawings. Whenever possible, the same reference numerals are used in the drawings and descriptions to indicate the same or similar parts.

Figure 2:
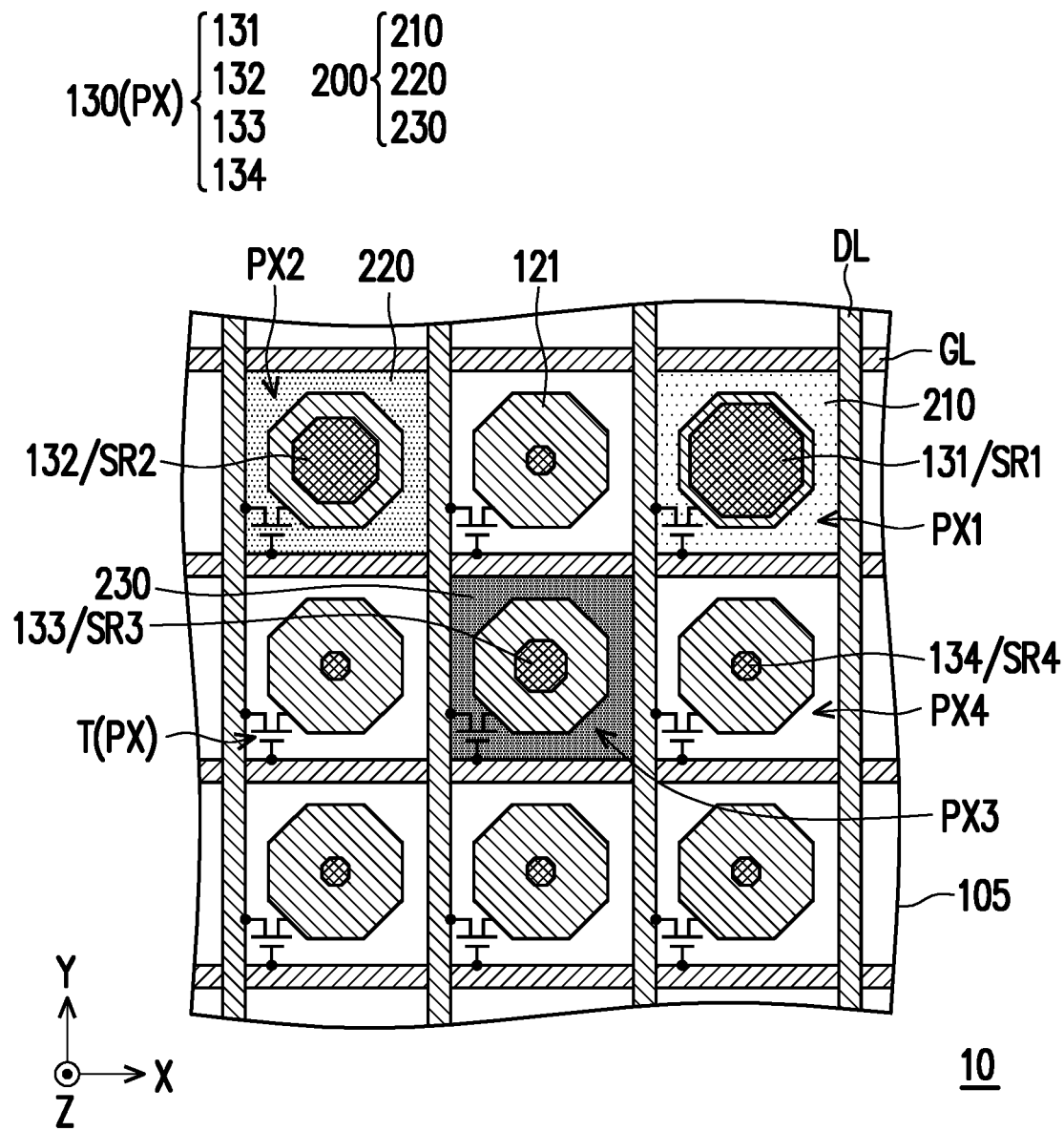
FIG. 2 is a schematic top view of a fingerprint sensing module in FIG. 1.
Figure 3A:
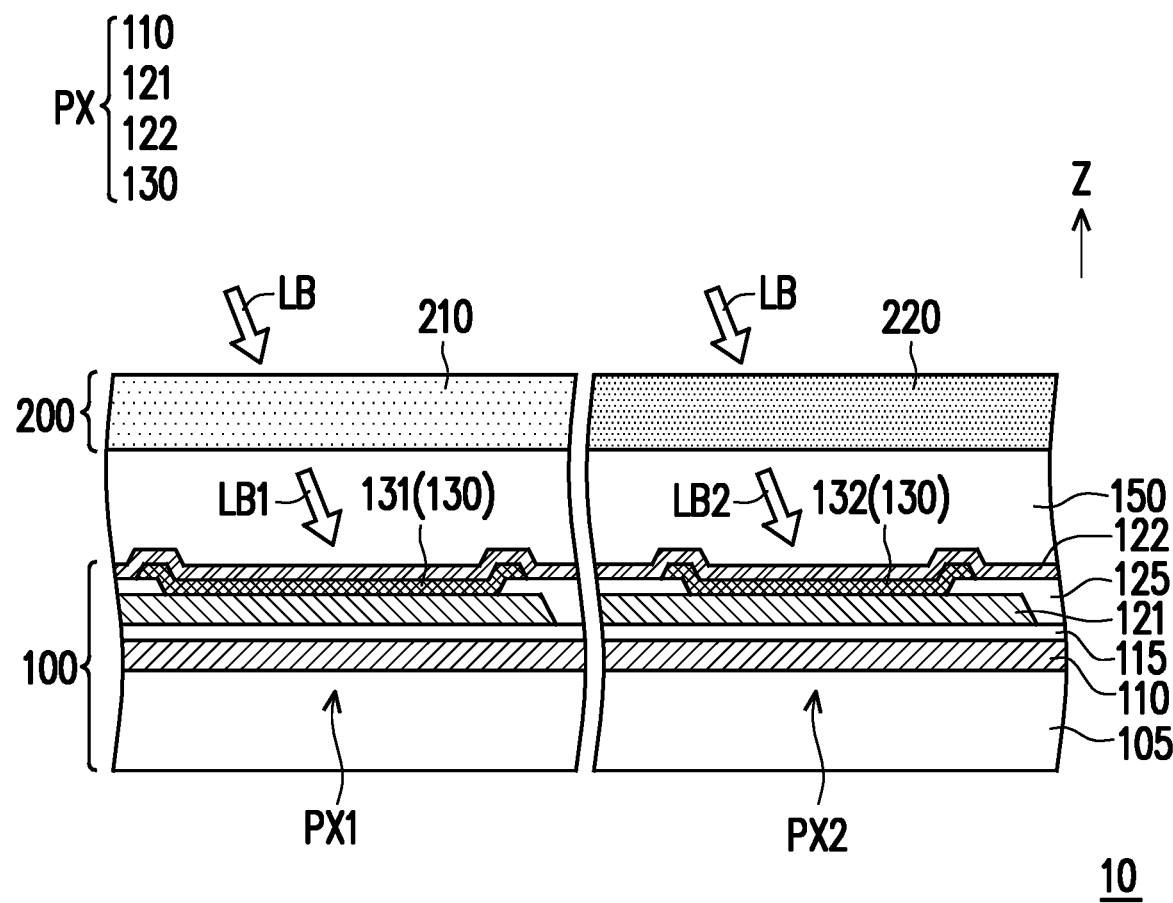
FIGS. 3A and 3B are schematic cross-sectional views of the fingerprint sensing module in FIG. 2.
Figure 3B:
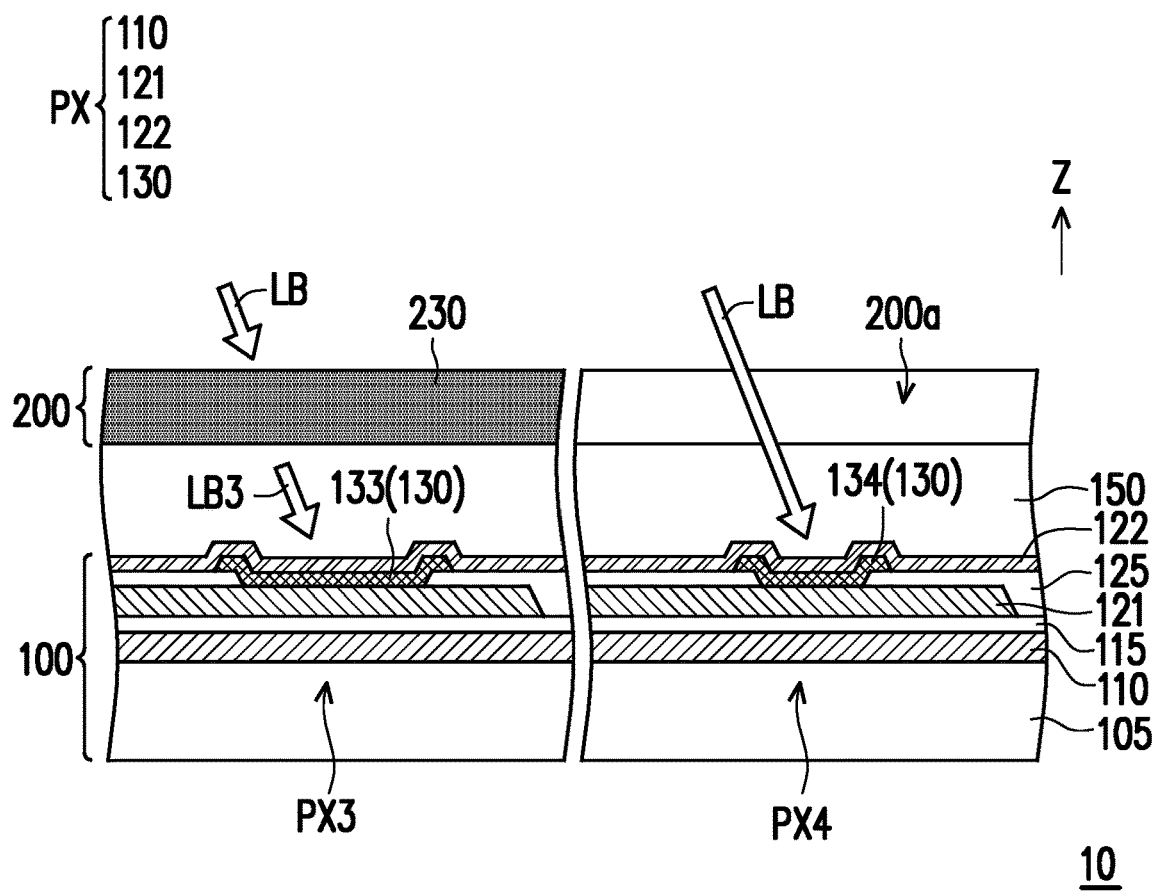
Figure 4:
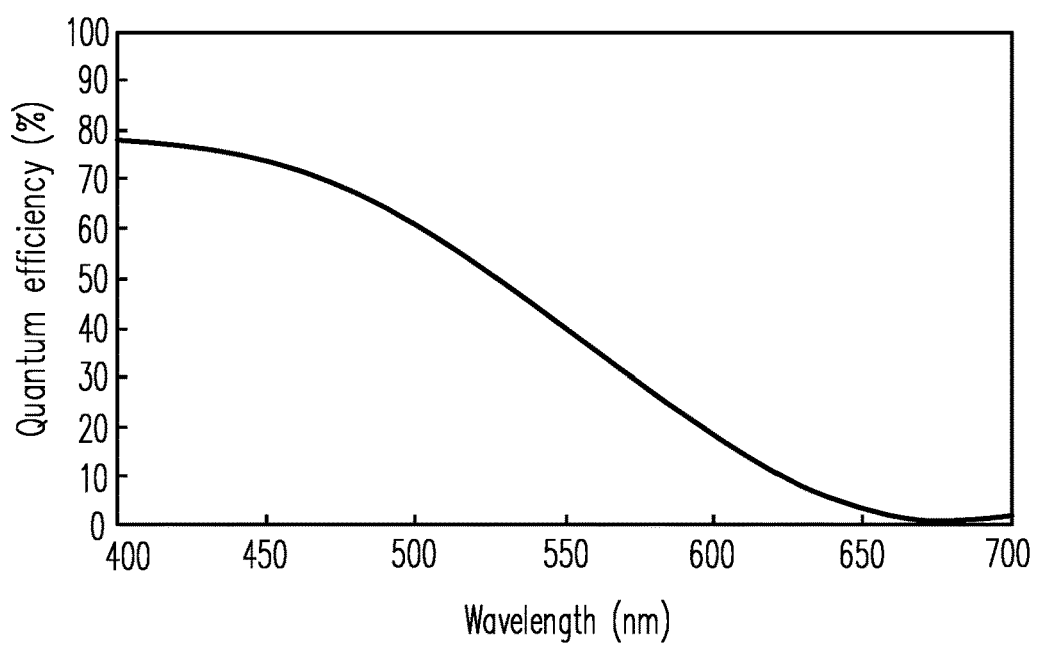
FIG. 4 is a graph of quantum efficiency against wavelength of a photosensitive pattern in FIGS. 3A and 3B.
Figure 5:
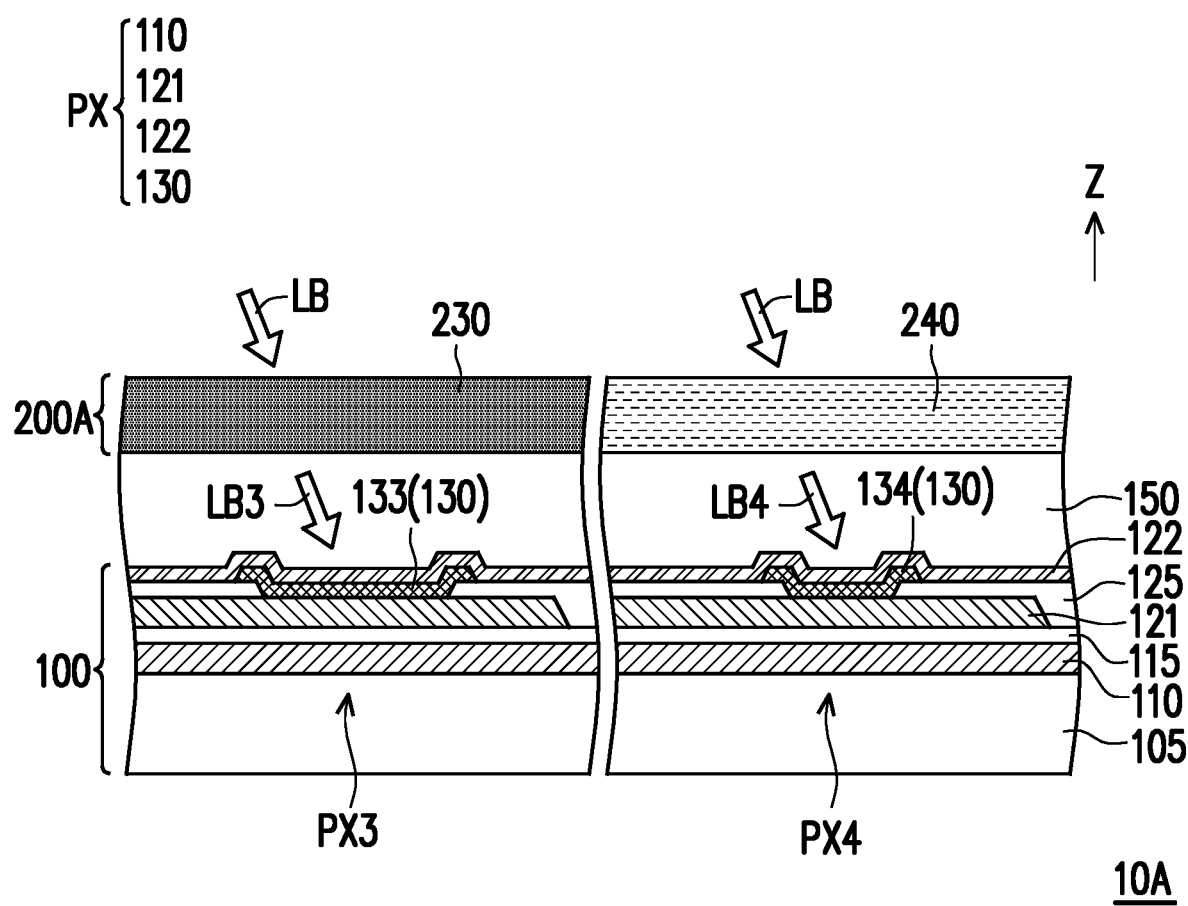
FIG. 5 is a schematic cross-sectional view of the fingerprint sensing module in FIG. 3B with a modification.

FIG. 1 is a schematic view of a fingerprint recognition device according to a first embodiment of the disclosure. FIG. 2 is a schematic top view of a fingerprint sensing module in FIG. 1. FIGS. 3A and 3B are schematic cross-sectional views of the fingerprint sensing module in FIG. 2. FIG. 4 is a graph of quantum efficiency against wavelength of a photosensitive pattern in FIGS. 3A and 3B. FIG. 5 is a schematic cross-sectional view of the fingerprint sensing module in FIG. 3B with a modification. For clarity of presentation, illustrations of an insulation layer 115, a second electrode 122, and an insulation layer 150 in FIGS. 3A and 3B are omitted in FIG. 2.

With reference to FIG. 1, a fingerprint recognition device 1 includes a display panel DP and a fingerprint sensing module 10. The fingerprint sensing module 10 is, for example, disposed underneath the display panel DP (that is, on a side of the display panel DP away from a display surface DPs), and the display panel DP is a self-luminous display panel (such as an organic light-emitting diode (LED) panel, a sub-millimeter LED panel, or a miniature LED panel). That is, the fingerprint recognition device 1 of the embodiment is a fingerprint on display device, but is not limited thereto. For example, when the fingerprint recognition device 1 detects that a finger FG of a user touches the display panel DP, it controls the display panel DP to emit light to illuminate a surface (that is, a fingerprint surface FPs) of the finger FG of the user. A ray LB emitted by the display panel DP passes through the display panel DP and transmits to the fingerprint sensing module 10 after being (diffuse) reflected by the fingerprint surface FPs.

With reference to FIGS. 2 to 3B concurrently, the fingerprint sensing module 10 includes a photosensitive element layer 100 and a color filter layer 200 that are overlapped with each other. The photosensitive element layer 100 includes a substrate 105 and multiple photosensitive pixels PX disposed on the substrate 105. The photosensitive pixels PX are located between the color filter layer 200 and the substrate 105, and respectively have multiple photosensitive patterns 130. The color filter layer 200 is disposed between the photosensitive element layer 100 and the display panel DP, and has multiple color filter patterns and multiple openings 200a. The color filter patterns and the openings 200a respectively overlap the photosensitive pixels PX in a normal direction (such as a Z direction) of the substrate 105.

In the embodiment, the color filter layer 200 may include three color filter patterns suitable for allowing three kinds of colored lights to pass through, for example, a color filter pattern 210 suitable for allowing a red ray LB1 to pass through, a color filter pattern 220 suitable for allowing a green ray LB2 to pass through, and a color filter pattern 230 suitable for allowing a blue ray LB3 to pass through, but are not limited thereto. It should be noted that the color filter patterns of the color filter layer 200 are disposed among the multiple openings 200a in a scattered manner (as shown in FIG. 2). Therefore, a portion of the ray LB reflected by the fingerprint surface FPs is filtered by the color filter patterns before being transmitted to a portion of the photosensitive pixels PX, and another portion of the ray LB is directly transmitted to another portion of the photosensitive pixels PX via the openings 200a of the color filter layer 200. Therefore, the ray LB (for example, a first colored light) passing through the openings 200a may be a red light, a green light, a blue light, or a combination of the above. In other words, a color of the ray LB passing through the openings 200a may be the same or different from the blue ray LB3, the green ray LB2, and the red ray LB1 (such as a second colored light, a third colored light, and a fourth colored light).

The fingerprint sensing module 10 may be allowed to have an anti-counterfeiting function through configuration of the color filter layer 200. The photosensitive pixels PX overlapping the color filter patterns may be defined as anti-counterfeiting pixels, and the photosensitive pixels PX overlapping the openings 200a may be defined as non-anti-counterfeiting pixels. In the embodiment, a percentage value of a number of the multiple photosensitive pixels PX (that is, anti-counterfeiting pixels) overlapped by the color filter patterns to a number of all the photosensitive pixels PX (that is, a sum of numbers of the anti-counterfeiting pixels and the non-anti-counterfeiting pixels) of the photosensitive element layer 100 may be less than 30%. In a preferred embodiment, the percentage value may be between 2% and 9%.

However, the disclosure is not limited thereto. In order to reduce interference of an unintended ray, the openings 200a of the color filter layer 200 of the embodiment may also be selectively disposed with multiple infrared cut-off filter patterns 240 to form a color filter layer 200A of a fingerprint sensing module 10A shown in FIG. 5. The infrared light cut-off filter patterns 240 are suitable for filtering out an infrared wave band of a partial ray LB coming from the fingerprint surface FPs to form a ray LB4, and the ray LB4 may be a red light, a green light, a blue light or a combination of the above.

In the embodiment, a material of the photosensitive pattern 130 is, for example, silicon-rich oxide (SRO), and quantum efficiency for different colored colors is different from each other. For example, as shown in FIGS. 3A to 4, quantum efficiency of the photosensitive pattern 130 of the embodiment for the ray LB4 (such as the first colored light) may be greater than quantum efficiency of the photosensitive pattern 130 for the blue ray LB3 (such as the second colored light), the quantum efficiency of the photosensitive pattern 130 for the blue ray LB3 may be greater than quantum efficiency of the photosensitive pattern 130 for the green ray LB2 (such as the third colored light), and the quantum efficiency of photosensitive pattern 130 for the green ray LB2 may be greater than quantum efficiency of the photosensitive pattern 130 for the red ray LB1 (such as the fourth colored light).

It should be noted that the disclosure does not limit a magnitude relationship of the quantum efficiency of the photosensitive pattern 130 for the different colored lights. In other embodiments, the magnitude relationship may vary according to different material compositions (such as a suitable compound semiconductor material), for example, the quantum efficiency of the photosensitive pattern for the green ray LB2 may be greater than the quantum efficiency for the red ray LB1, while the quantum efficiency of the photosensitive pattern for the red ray LB1 may be greater than the quantum efficiency for the blue ray LB3.

Since a magnitude of a photocurrent generated by the photosensitive pattern 130 when irradiated by a ray is proportional to a multiplication value of a light-receiving area 130 (such as an orthographic projection area of the photosensitive pattern 130 on the substrate 105 in the embodiment) of the photosensitive pattern and the quantum efficiency of the photosensitive pattern 130 for the ray. Therefore, the embodiment varies a photocurrent value of the photosensitive pattern 130 when irradiated by different rays through adjusting the orthographic projection area of the photosensitive pattern 130 of the photosensitive pixel PX on the substrate 105, so as to enable the photocurrent value generated the photosensitive pixel PX when irradiated by the different colored lights to be controlled within a value range of a same degree, thereby improving sensing sensitivity difference of the photosensitive pixel PX to the different colored lights. In the embodiment, the photosensitive element layer 100 may include a photosensitive pixel PX1, a photosensitive pixel PX2, a photosensitive pixel PX3, and a photosensitive pixel PX4, and the orthographic projection areas of the respective photosensitive patterns 130 of the photosensitive pixels on the substrate 105 are different, but is not limited thereto. In other embodiments, a number of types of the photosensitive pattern 130 disposed on the photosensitive element layer may also five or more, or three or less.

For example, if the four photosensitive patterns 130 of the embodiment are sorted according to size of the orthographic projection area of the respective photosensitive patterns 130 of the four photosensitive pixels PX1 to PX4 on the substrate 105, then the photosensitive pixels sorted in descending order is a photosensitive pattern 131 of the PX1, a photosensitive pattern 132 of the photosensitive pixel PX2, a photosensitive pattern 133 of the photosensitive pixel PX3, and a photosensitive pattern 134 of the photosensitive pixel PX4. From another point of view, in the embodiment, the photosensitive pattern 130 of the photosensitive pixel PX may define a photosensitive region of the photosensitive element layer 100, for example, the photosensitive pattern 131, the photosensitive pattern 132, the photosensitive pattern 133, and the photosensitive pattern 134 may respectively define a photosensitive region SR1, a photosensitive region SR2, a photosensitive region SR3, and a photosensitive region SR4, and an orthographic projection areas of the photosensitive regions on the substrate 105 are different from each other.

Since the sizes of the photosensitive regions are different from each other, the sensing sensitivity difference between the photosensitive pixels (such as photosensitive pixel PX1 to the photosensitive pixel PX4) for sensing the different colored lights is reduced, which helps to improve image sensing quality of the fingerprint sensing module 10.

Furthermore, the photosensitive pixel PX also has an active element T, a first electrode 121 and a second electrode 122. For example, the fingerprint sensing module 10 further includes multiple scan lines GL and multiple data lines DL. The scan lines GL are arranged in a Y direction and extend in an X direction, and the data lines DL are arranged in the X direction and extend in the Y direction. That is, the data lines DL intersect the scan lines GL and define multiple pixel regions. The multiple photosensitive pixels PX are disposed in the pixel regions, and each of the photosensitive pixels PX is electrically connected to a corresponding scan line GL and a corresponding data line DL. That is to say, the multiple photosensitive pixels PX of the embodiment are arranged on the substrate 105 in an array, but are not limited thereto.

The first electrode 121 and the second electrode 122 are respectively disposed on two opposite sides of the photosensitive pattern 130 and are electrically connected to the photosensitive pattern 130. The first electrode 121 is electrically coupled to one of the data lines DL and one of the scan lines GL via the active element T. The active element T here is, for example, a thin film transistor (TFT), and the active elements are suitable for sequentially transmitting electrical signals from the photosensitive pixels PX to a signal processing circuit (not shown) via the multiple data lines DL in a time sequence, so as to perform recognition of a fingerprint image, but is not limited thereto. In addition, an insulation layer 125 is disposed between the first electrode 121 and the second electrode 122 to ensure electrical independence of the two electrodes, and the photosensitive pattern 130 penetrates the insulation layer 125 to be electrically connected between the first electrode 121 and the second electrode 122.

The first electrode 121 is, for example, a reflective electrode. A material of the reflective electrode includes a metal, an alloy, a nitride of a metallic material, an oxide of a metallic material, an oxynitride of a metallic material, or other suitable materials, or a stacked layer of a metallic material and other conductive materials. The second electrode 122 is, for example, a transparent electrode. A material of the transparent electrode includes a metal oxide, such as indium tin oxide, indium zinc oxide, aluminum tin oxide, aluminum zinc oxide, or other suitable oxides, or a stacked layer of at least two of the above. However, the disclosure is not limited thereto. According to other embodiments, the materials of the first electrode 121 and the second electrode 122 may be respectively adjusted according to an actual light-receiving surface design or manufacturing process considerations.

On the other hand, the photosensitive pixel PX may also optionally have a conductive pattern 110. The first electrode 121 overlaps the conductive pattern 110 in the normal direction (such as the Z direction) of a surface of the substrate 105, and is located between the photosensitive pattern 130 and the conductive pattern 110. The insulation layer 115 is disposed between the first electrode 121 and the conductive pattern 110 to electrically insulate each other, and forms a storage capacitor of the photosensitive pixel PX. In the embodiment, the insulation layer 150 may be optionally disposed between the photosensitive element layer 100 and the color filter layer 200, and the insulation layer 150 is, for example, a flat layer, but is not limited thereto. In other embodiments, the insulation layer 150 may also be replaced by a collimation structure layer. The collimation structure layer is, for example, an alternating stacked structure of at least two light shielding pattern layers and multiple insulation layers, and is configured to restrict an incident angle of the ray LB when entering the photosensitive element layer 100, thereby improving fingerprint recognition capability (or resolution of the fingerprint image) of the fingerprint sensing module 10.

Other embodiments are listed below to describe the disclosure in detail, in which the same components are marked by the same reference numerals, and description of the same technical content is omitted. Reference may be made to the foregoing embodiments for the omitted parts, which are not repeated hereafter.

Figure 6:
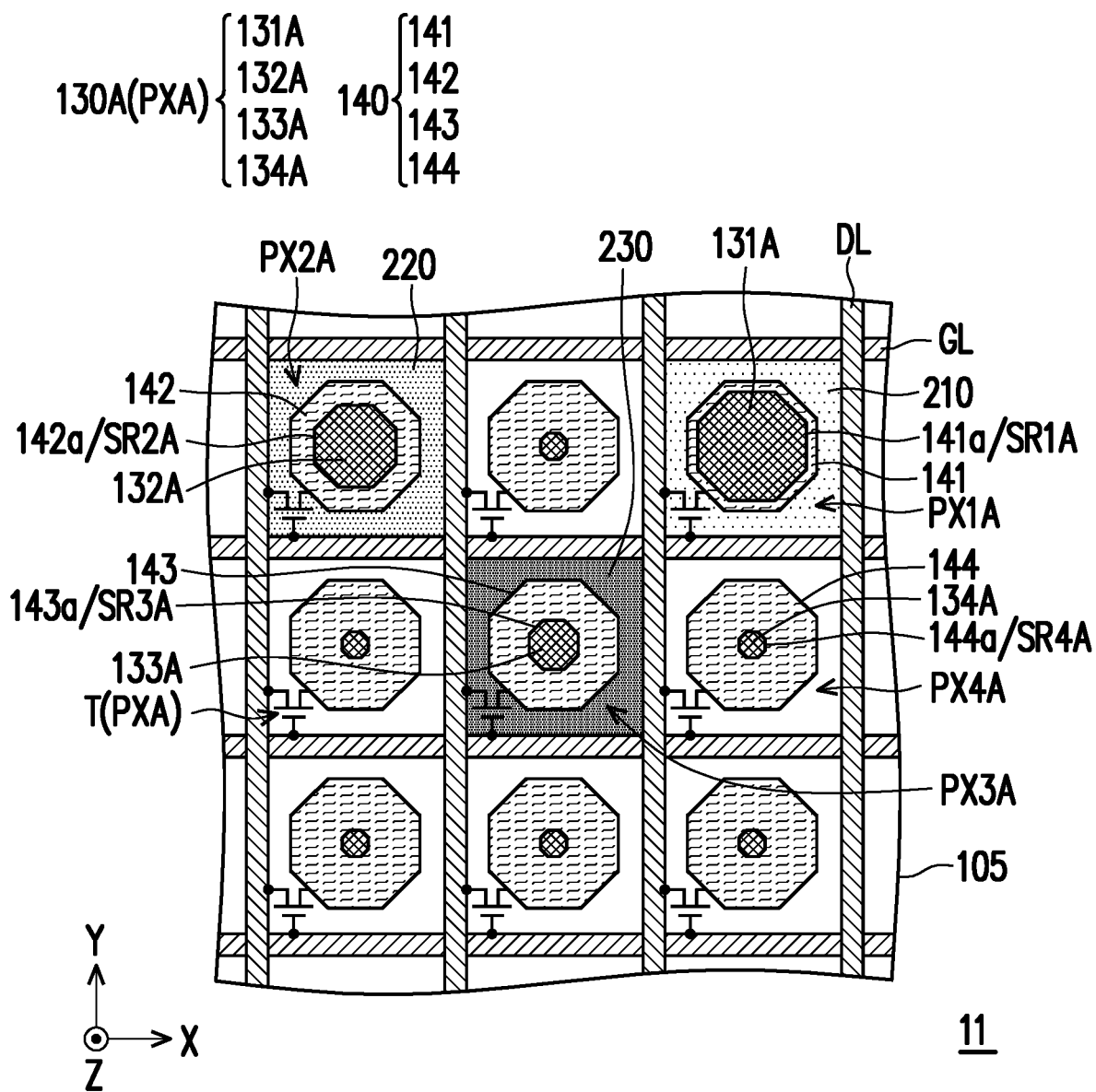
FIG. 6 is a schematic top view of a fingerprint sensing module according to a second embodiment of the disclosure.
Figure 7A:
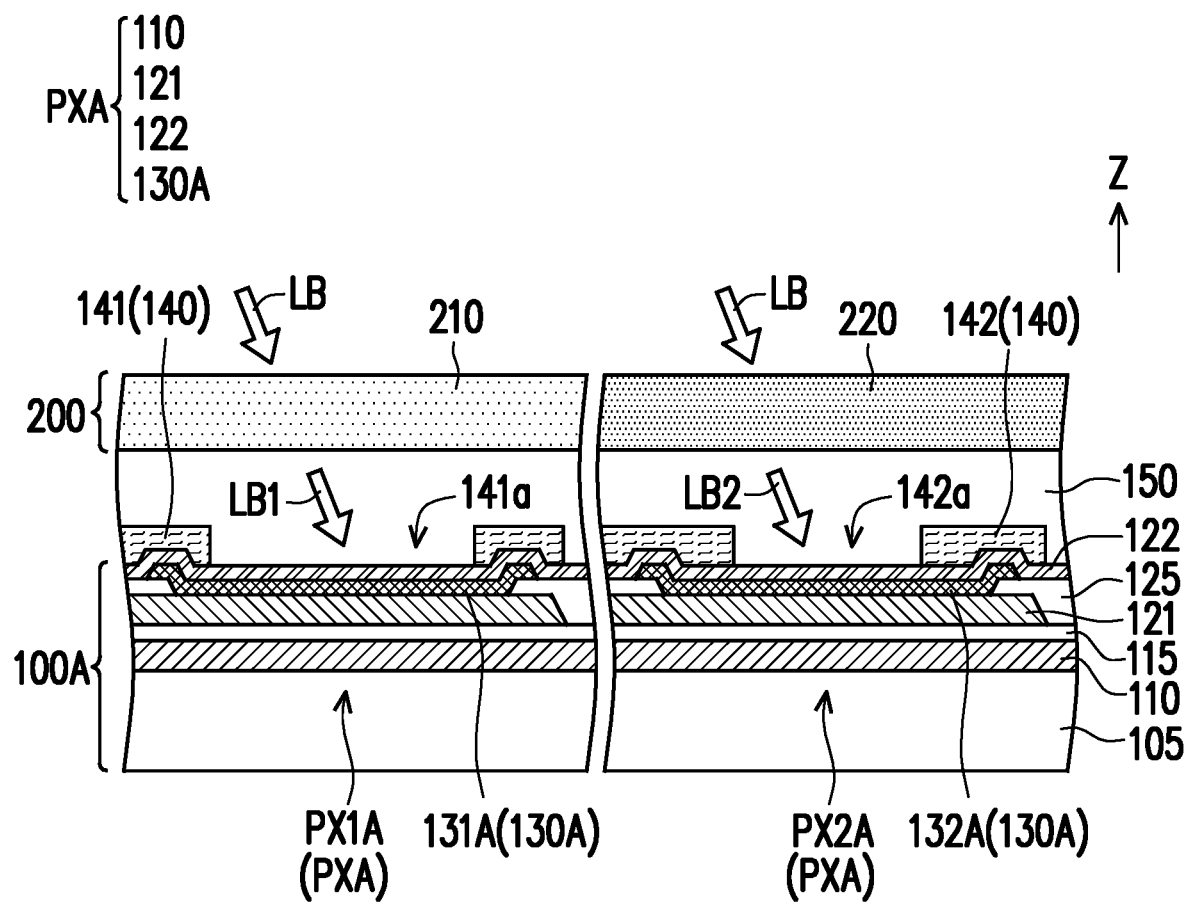
FIGS. 7A and 7B are schematic cross-sectional views of the fingerprint sensing module in FIG. 6.
Figure 7B:
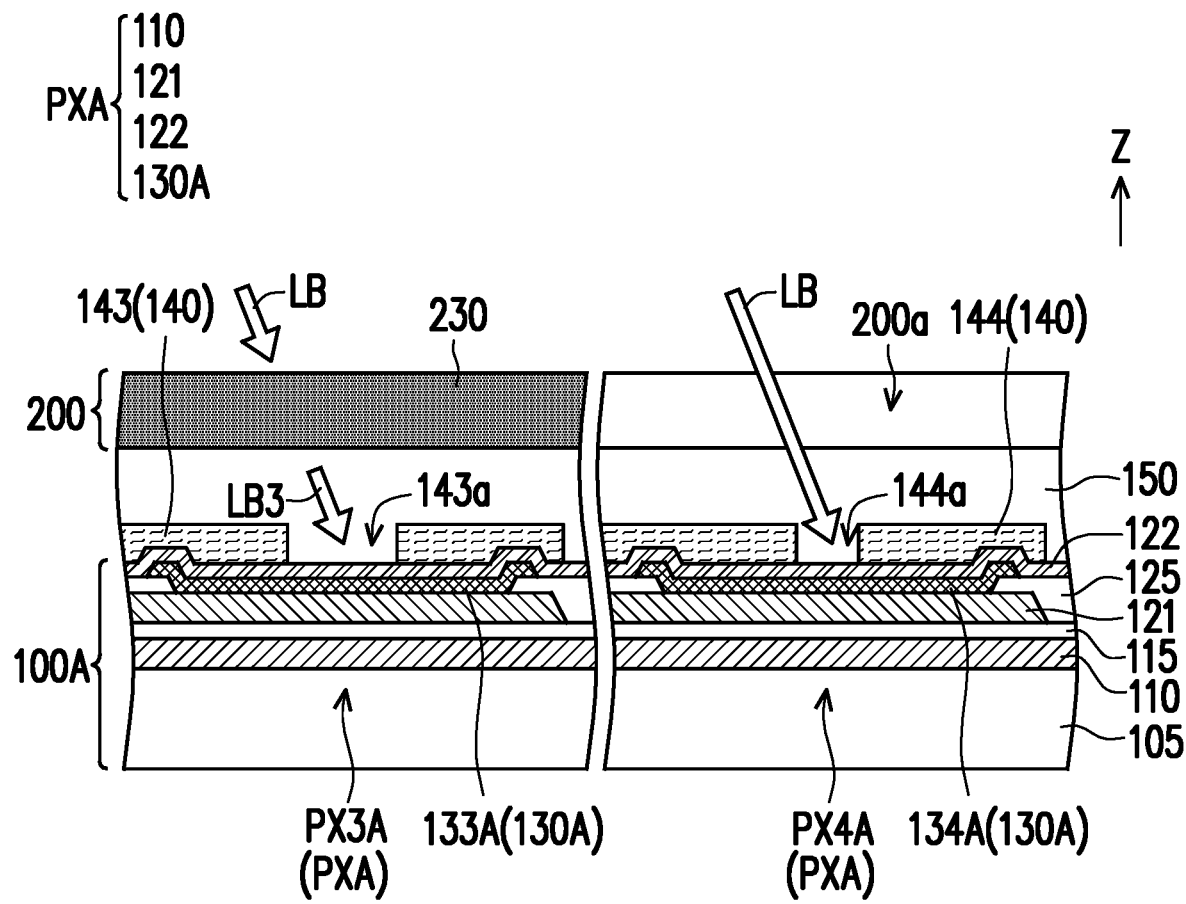

FIG. 6 is a schematic top view of a fingerprint sensing module according to a second embodiment of the disclosure. FIGS. 7A and 7B are schematic cross-sectional views of the fingerprint sensing module in FIG. 6. For clarity of presentation, the illustrations of the insulation layer 115, the second electrode 122, and the insulation layer 150 in FIGS. 7A and 7B are omitted in FIG. 6.

With reference to FIGS. 6 to 7B, a difference between a fingerprint sensing module 11 of the embodiment and the fingerprint sensing module 10 in FIG. 2 is that the fingerprint sensing module 11 further includes a light shielding pattern layer 140 disposed on the multiple photosensitive patterns 130. In the embodiment, the light shielding pattern layer 140 includes multiple light shielding patterns disposed corresponding to multiple photosensitive pixels PXA, and the light shielding patterns have openings of four different sizes. A material of the light shielding pattern layer 140 may include a metal, a black resin, or other suitable light-absorbing materials.

For example, the light shielding pattern layer 140 is located in an opening 141a, an opening 142a, an opening 143a, and an opening 144a respectively of a light shielding pattern 141, a light shielding pattern 142, a light shielding pattern 143, and a light shielding pattern 144 of a photosensitive pixel PX1A, a photosensitive pixel PX2A, a photosensitive pixel PX3A, and a photosensitive pixel PX4A. The openings define a photosensitive region SR1A, a photosensitive region SR2A, a photosensitive region SR3A, and a photosensitive region SR4A of the photosensitive pixel PX1A, the photosensitive pixel PX2A, the photosensitive pixel PX3A, and the photosensitive pixel PX4A. If the photosensitive regions of the embodiment are sorted according to size of an orthographic projection area of the respective photosensitive regions of the four photosensitive pixels PX1A to PX4A on the substrate 105, then the photosensitive regions sorted in a descending order is the photosensitive region SR1A of the photosensitive pixel PX1A, the photosensitive region SR2A of the photosensitive pixel PX2A, the photosensitive region SR3A of the photosensitive pixel PX3A, and the photosensitive region SR4A of the photosensitive pixel PX4A.

In the embodiment, since the photosensitive regions of the photosensitive pixels PXA are defined by the multiple openings of the light shielding pattern layer 140, orthographic projections of a photosensitive pattern 130A (such as a photosensitive pattern 131A of the photosensitive pixel PX1A, a photosensitive pattern 132A of the photosensitive pixel PX2A, a photosensitive pattern 133A of the photosensitive pixel PX3A, and a photosensitive pattern 134A of the photosensitive pixel PX4A) of each of the photosensitive pixels PXA of a photosensitive element layer 100A may selectively be the same, but are not limited thereto.

Figure 8:
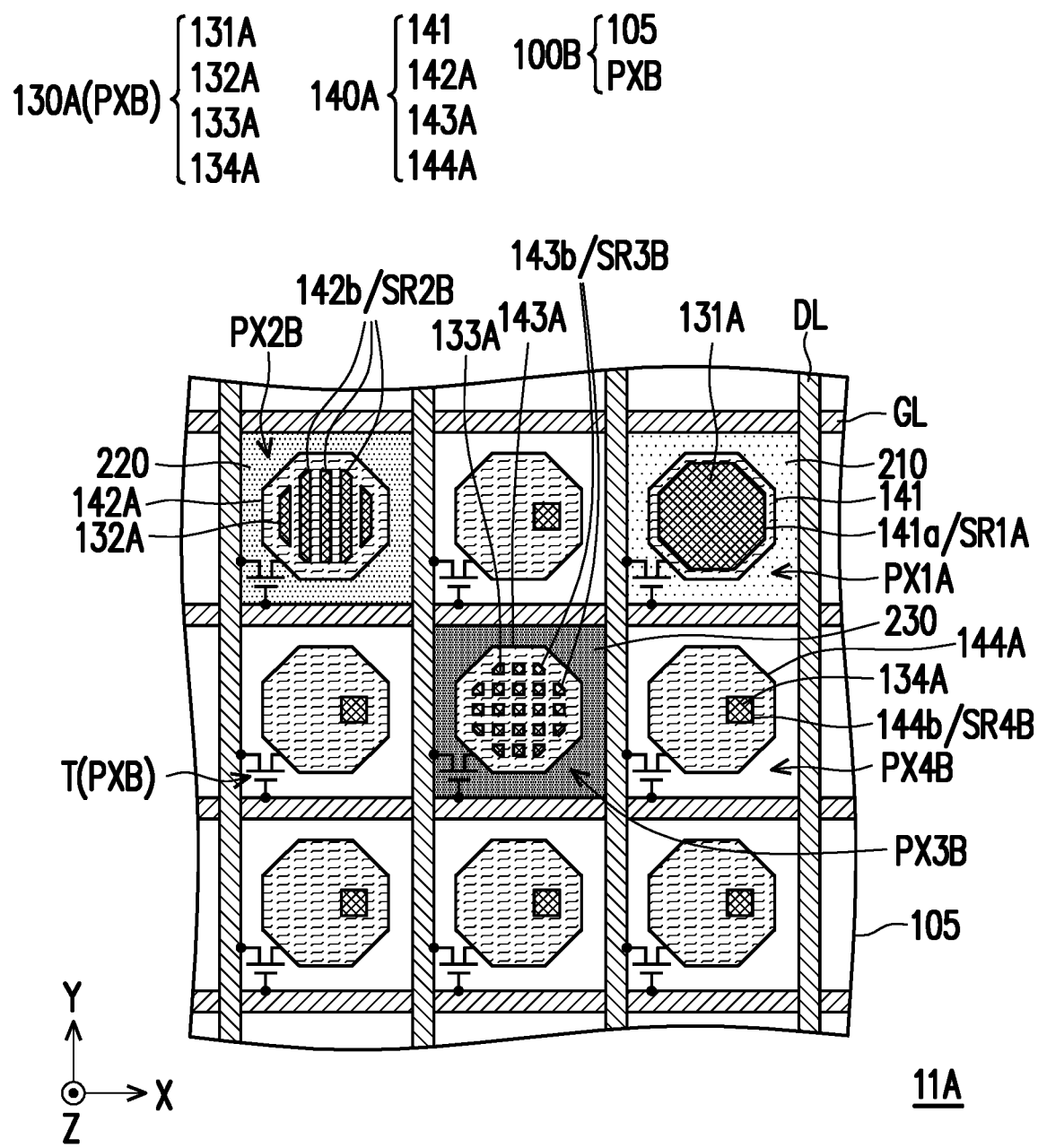
FIG. 8 is a schematic top view of a fingerprint sensing module according to a third embodiment of the disclosure.

FIG. 8 is a schematic top view of a fingerprint sensing module according to a third embodiment of the disclosure. With reference to FIG. 8, a difference between a fingerprint sensing module 11A of the embodiment and the fingerprint sensing module 11 in FIG. 6 is that an opening structure of a portion of light shielding patterns of a light shielding pattern layer 140A is different from an opening structure of a portion of the light shielding patterns of the light shielding pattern layer 140. For example, in the embodiment, the light shielding pattern layer 140A defines an opening 142b of a light shielding pattern 142A of a photosensitive region SR2B of a photosensitive pixel PX2B to be composed of multiple separate sub-openings, and the sub-openings of the light shielding pattern 142A are arranged at intervals in the X direction. Similarly, the light shielding pattern layer 140A defines an opening 143b of a light shielding pattern 143A of a photosensitive region SR3B of a photosensitive pixel PX3B to be composed of multiple separate sub-openings, and the sub-openings of the light shielding pattern 143A are respectively arranged at intervals in the X direction and the Y direction. In addition, the light shielding pattern layer 140A defines that an orthographic projection of an opening 144b of a light shielding pattern 144A of a photosensitive region SR4B of a photosensitive pixel PX4B on the substrate 105 to be a rectangle.

In other words, the disclosure does not limit an orthographic projection structure of the photosensitive region of each of photosensitive pixels PXB of a photosensitive element layer 100B on the substrate 105, as long as relative size of an orthographic projection area the respective photosensitive regions of the photosensitive pixel PX1B, the photosensitive pixel PX2B, the photosensitive pixel PX3B, and the photosensitive pixel PX4B on the substrate 105 satisfies the magnitude relationship of the respective photosensitive regions of the photosensitive pixel PX1A to the photosensitive pixel PX4A of the foregoing embodiment (the fingerprint sensing module 11 in FIG. 6).

Figure 9A:
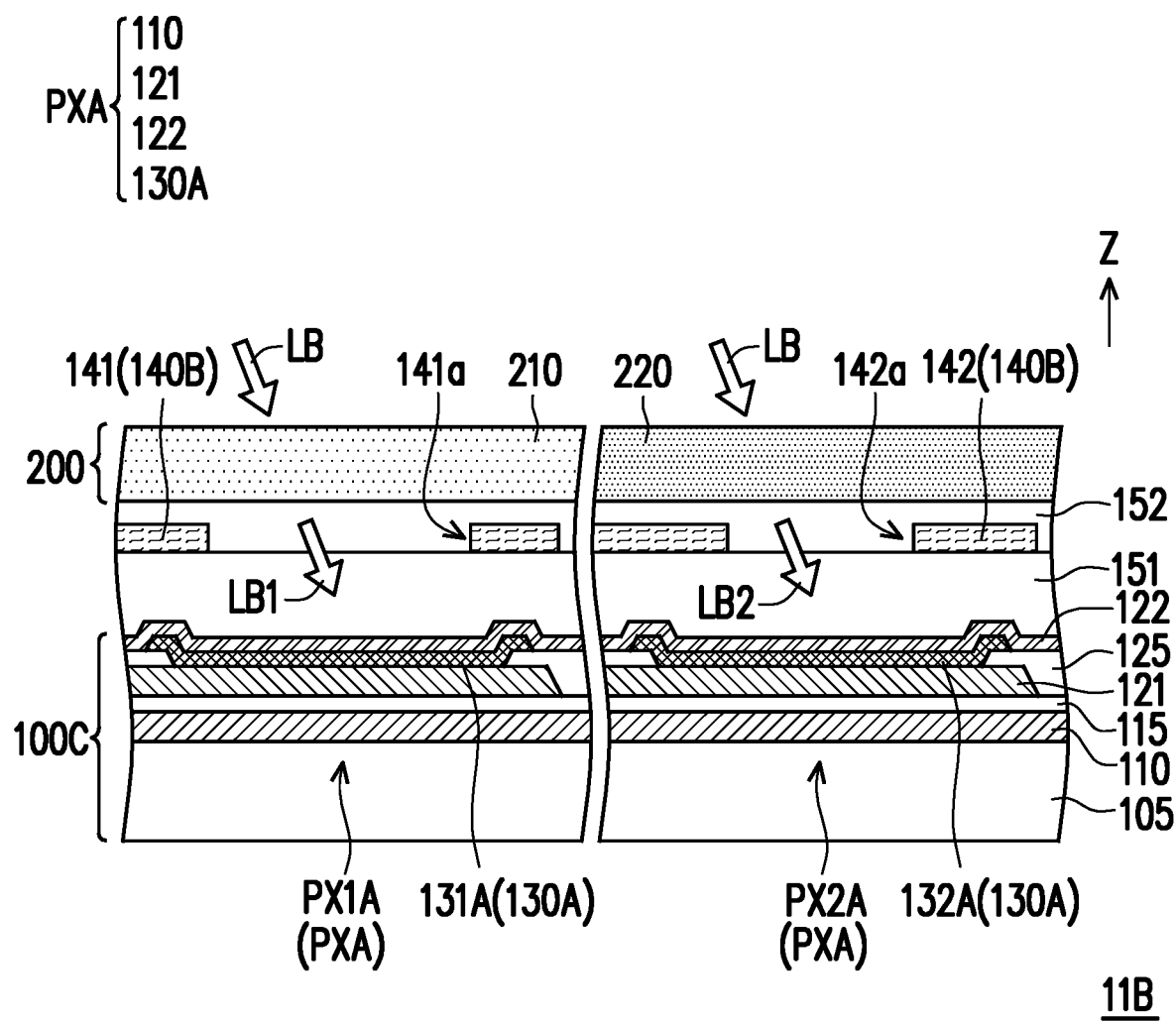
FIGS. 9A and 9B are schematic cross-sectional views of a fingerprint sensing module according to a fourth embodiment of the disclosure.
Figure 9B:
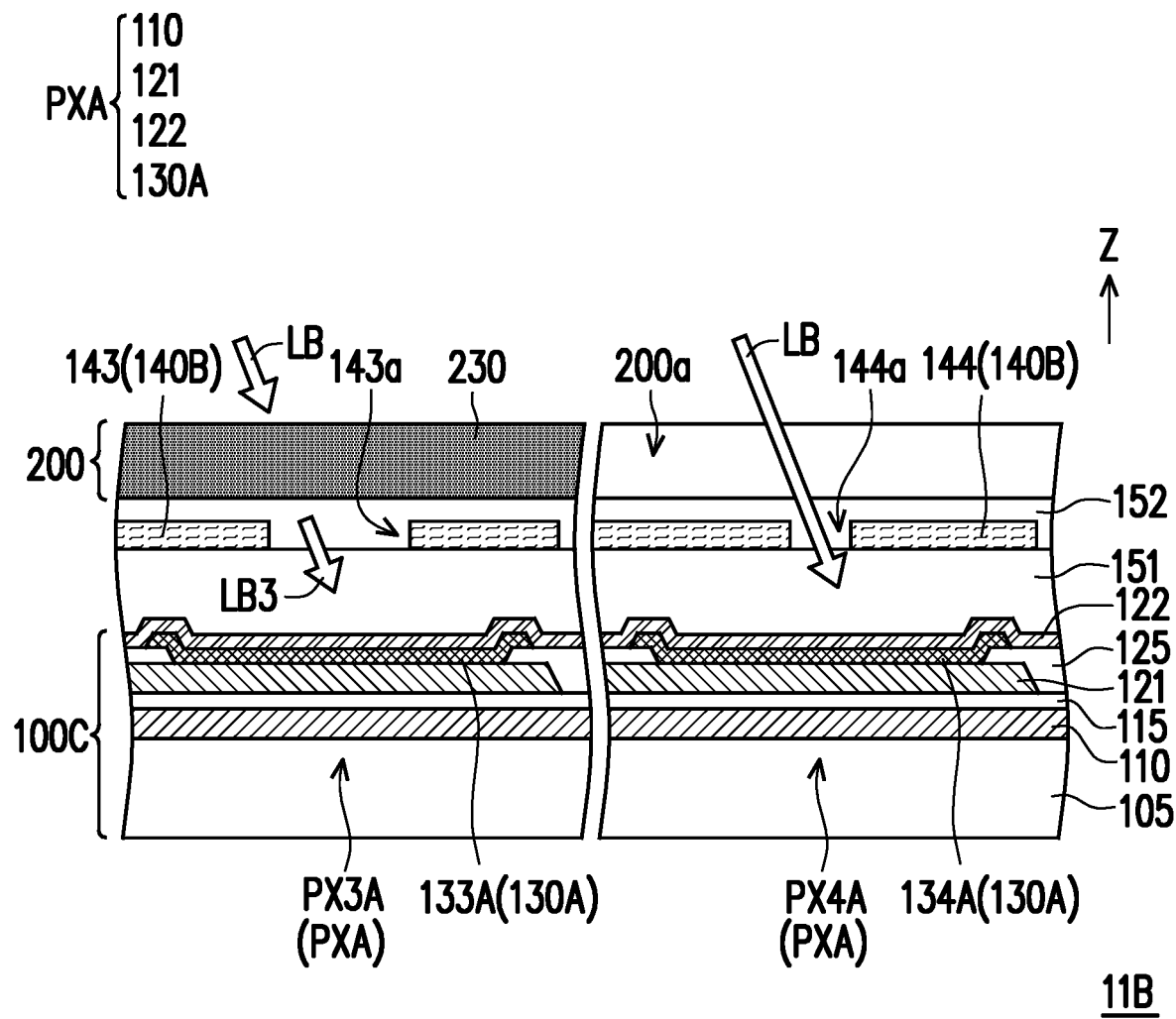

FIGS. 9A and 9B are schematic cross-sectional views of a fingerprint sensing module according to a fourth embodiment of the disclosure. With reference to FIGS. 9A and 9B, a difference between a fingerprint sensing module 11B of the embodiment and the fingerprint sensing module 11 in FIGS. 6 to 7B is that an insulation layer 151 is disposed between a photosensitive element layer 100C and a light shielding pattern layer 140B of the fingerprint sensing module 11B, and another insulation layer 152 is disposed between the light shielding pattern layer 140B and the color filter layer 200.

More specifically, the disclosure does not limit a film layer configuration of the light shielding pattern layer on the photosensitive element layer. For example, the fingerprint sensing module 11B may further include at least one metal conductive layer (not shown) between the color filter layer 200 and the photosensitive element layer 100C, and the light shielding pattern layer 140B and one of the metal conductive layers may selectively belong to the same film layer. Additional production costs can be prevented through integration of the light shielding pattern layer 140B with the existing film layer manufacturing process.

Figure 10:
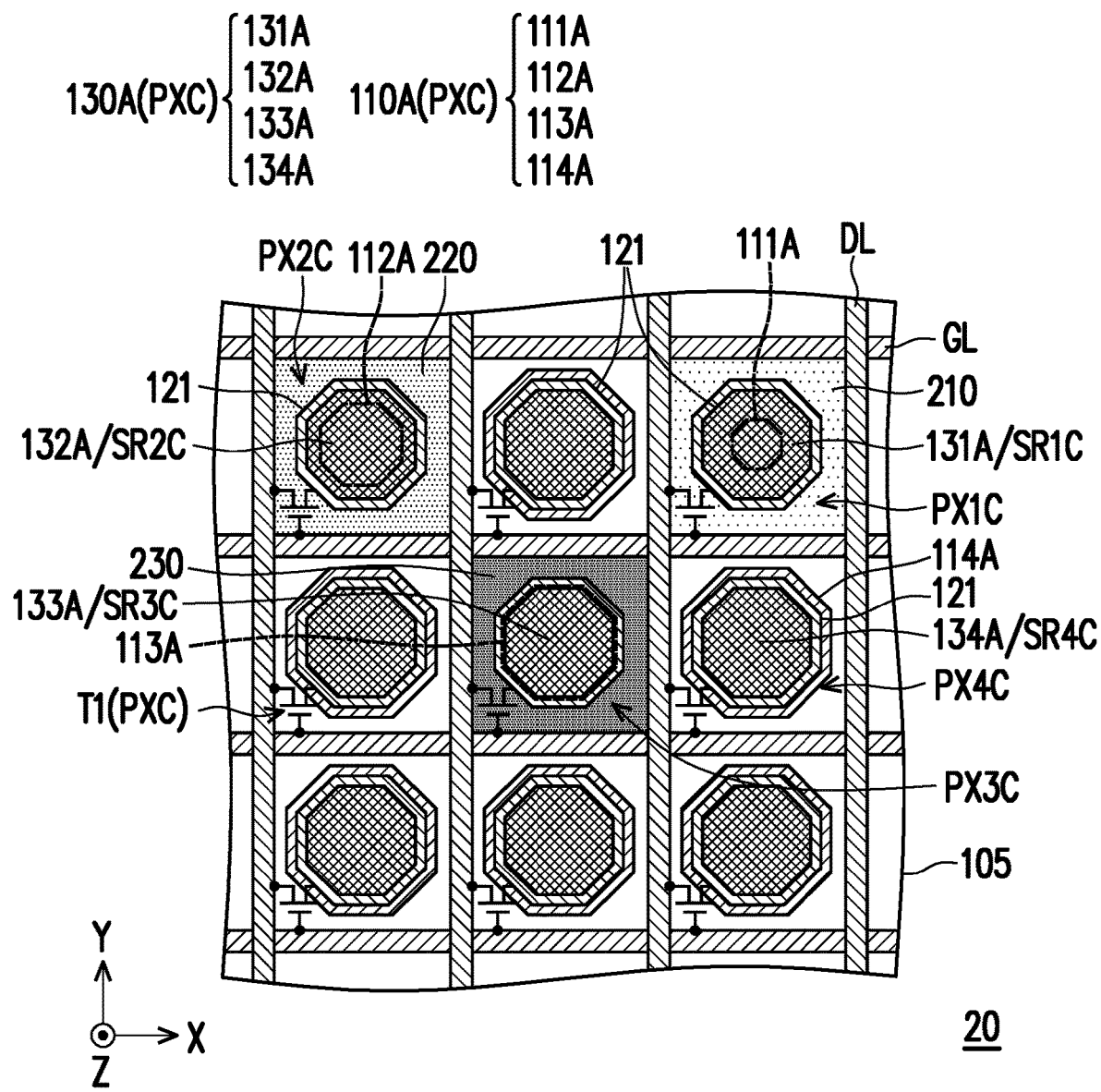
FIG. 10 is a schematic top view of a fingerprint sensing module according to a fifth embodiment of the disclosure.
Figure 11A:
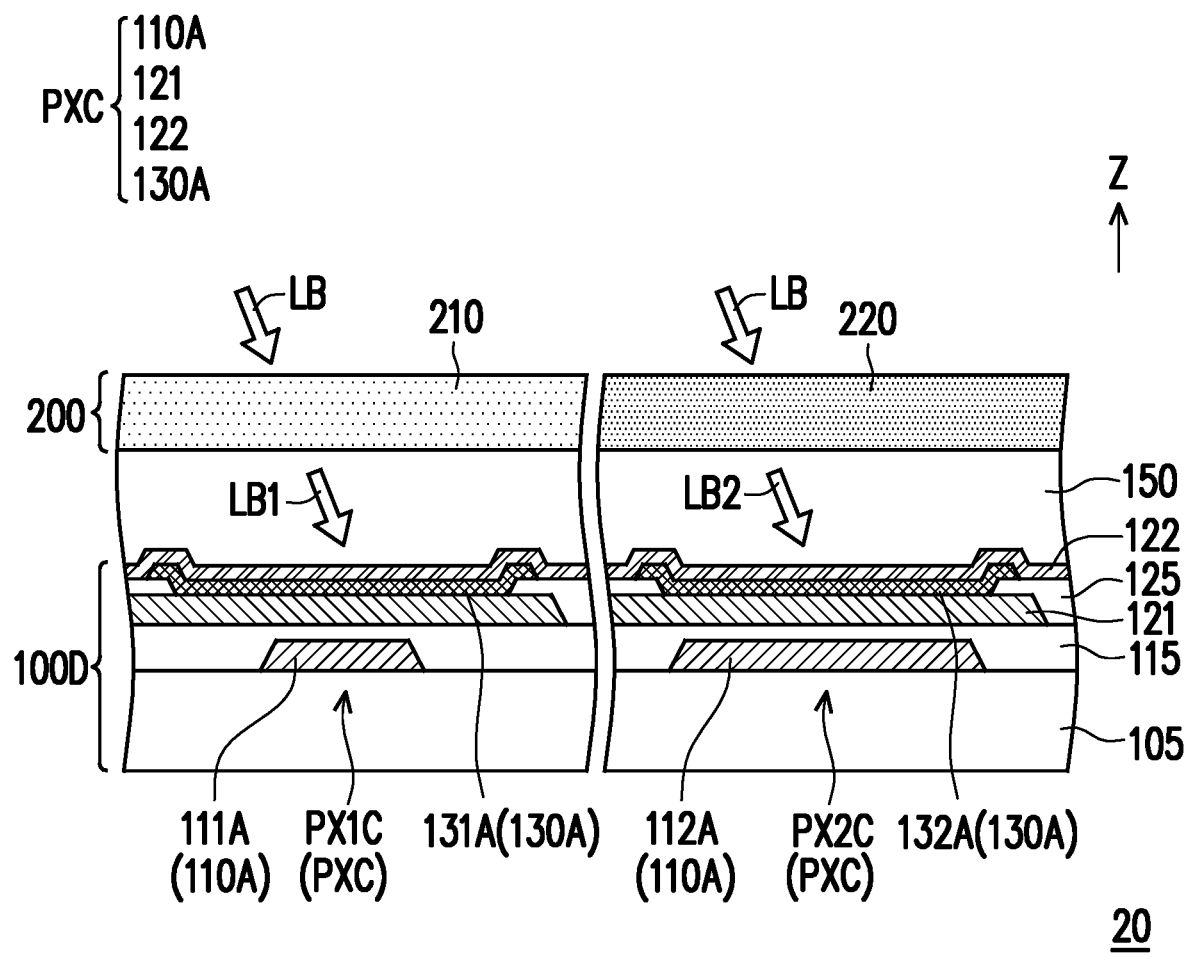
FIGS. 11A and 11B are schematic cross-sectional views of the fingerprint sensing module in FIG. 10.
Figure 11B:
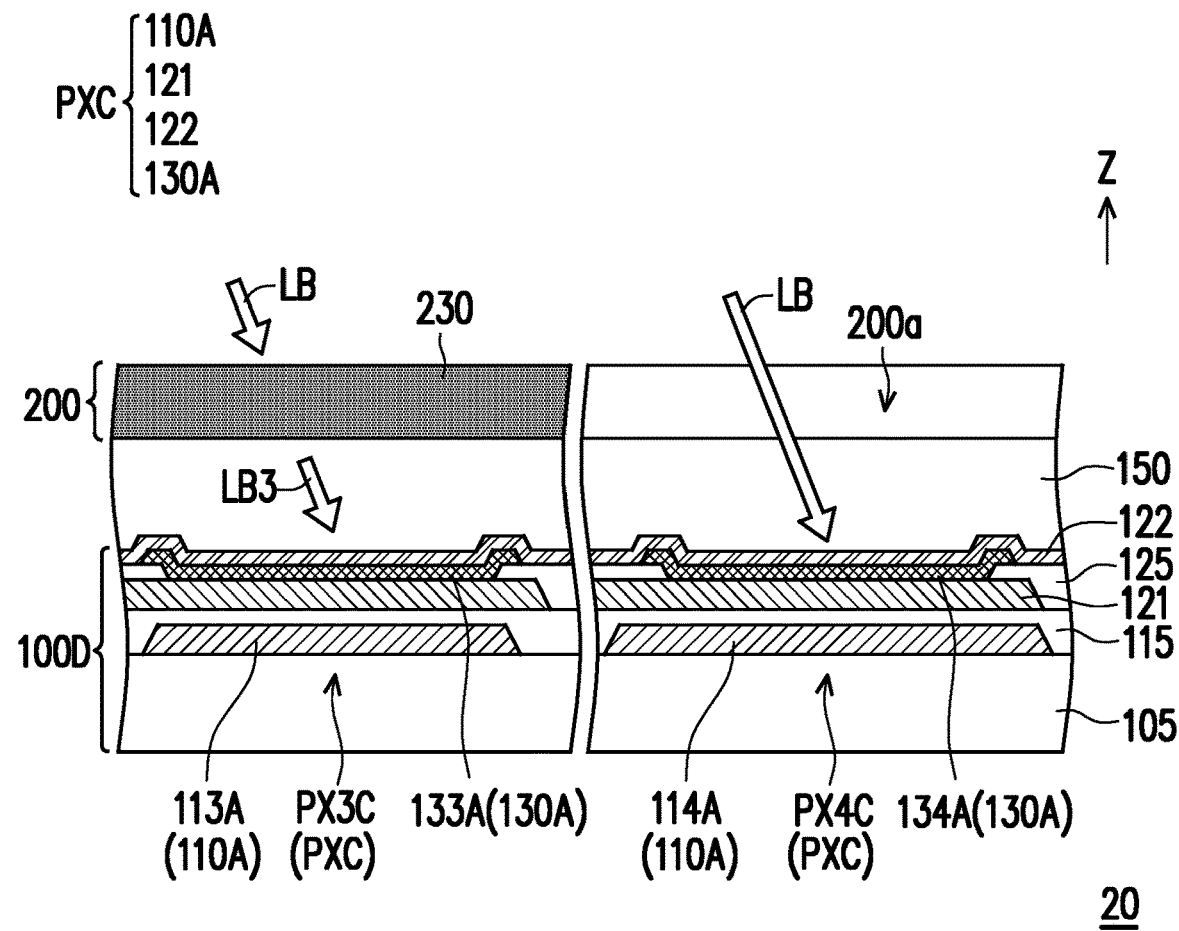
Figure 12:
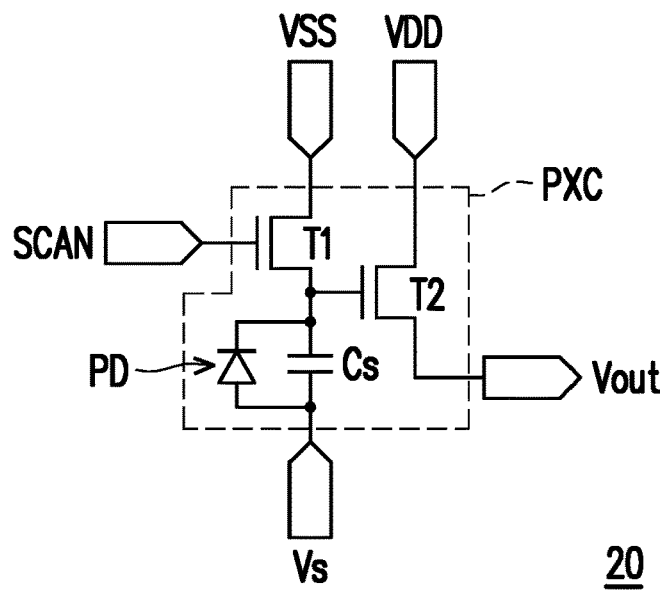
FIG. 12 is a schematic circuit view of the fingerprint sensing module in FIG. 10.

FIG. 10 is a schematic top view of a fingerprint sensing module according to a fifth embodiment of the disclosure. FIGS. 11A and 11B are schematic cross-sectional views of the fingerprint sensing module in FIG. 10. FIG. 12 is a schematic circuit view of the fingerprint sensing module in FIG. 10. For clarity of presentation, the illustrations of the insulation layer 115, the second electrode 122, and the insulation layer 150 in FIGS. 11A and 11B are omitted in FIG. 10.

With reference to FIGS. 10 to 11B, a main difference between a fingerprint sensing module 20 of the embodiment and the fingerprint sensing module 10 in FIGS. 2 to 3B is that configurations of the conductive pattern and the photosensitive pattern are different. In the embodiment, an orthographic projection area of the photosensitive pattern 130A of each of photosensitive pixels PXC of a photosensitive element layer 100D on the substrate 105 is substantially the same. For example, an orthographic projection area of the photosensitive pattern 131A (or a photosensitive region SR1C) of a photosensitive pixel PX1C, the photosensitive pattern 132A (or a photosensitive region SR2C) of a photosensitive pixel PX2C, the photosensitive pattern 133A (or a photosensitive region SR3C) of a photosensitive pixel PX3C and the photosensitive pattern 134A (or a photosensitive region SR4C) of a photosensitive pixel PX4C on the substrate 105 is the same as each other.

With reference to FIG. 12 concurrently, in the embodiment, the photosensitive pixels PXC of the fingerprint sensing module 20 is, for example, an active pixel sensor (APS), but is not limited thereto. For example, a number of active elements of the photosensitive pixels PXC of the photosensitive element layer 100D may be two, a first active element T1 and a second active element T2 respectively. A gate of the first active element T1 receives a gate driving signal SCAN, a drain of the first active element T1 is coupled to a system low voltage VSS, and a source of the first active element T1 is coupled to a gate of the second active element T2, a terminal of a photosensitive element PD, and a terminal of a storage capacitor Cs. Another terminal of the photosensitive element PD and another terminal of the storage capacitor Cs receive a set voltage Vs, and the set voltage Vs is, for example, a bias signal transmitted by another scan line. A source of the second active element T2 receives a system high voltage VDD, a drain of the second active element T2 outputs a voltage signal Vout, and the voltage signal Vout and the photosensitive element PD are positively correlated to a cross-pressure change amount generated at two terminals of the storage capacitor Cs when irradiated by a ray.

In particular, the photosensitive element PD is composed of the photosensitive pattern 130A, the first electrode 121 and the second electrode 122, and the storage capacitor Cs is composed of the first electrode 121 and a conductive pattern 110A. Since quantum efficiency of the photosensitive pattern 130A of the photosensitive pixel PXC for different colored lights are different, a photocurrent generated by the photosensitive pattern 130A is still different when irradiated by the different colored lights, even if light intensity and an irradiation area are the same. In order to balance sensitivity of the photosensitive pixel PX to the different colored lights, the embodiment enables the cross-pressure change amount generated at the two terminals of the storage capacitor Cs when the photosensitive pixel PXC is irradiated by the different colored lights (such as the red ray LB1, the green ray LB2, and the blue ray LB3) to be controlled within the value range of the same degree through adjusting a capacitance value of the storage capacitor Cs of the photosensitive pixel PXC.

Specifically, when an orthographic projection area of the respective first electrodes 121 of the photosensitive pixels on the substrate 105 is the same, orthographic projection areas of the respective conductive patterns 110A of the photosensitive pixels on the substrate 105 are different from each other. For example, if the multiple conductive patterns 110A of the photosensitive pixels are sorted according to size of the orthographic projection area of the conductive patterns 110A on the substrate 105, then in a descending order is a conductive pattern 114A of the photosensitive pixel PX4C, a conductive pattern 113A of the PX3C, a conductive pattern 112A of the photosensitive pixel PX2C, and a conductive pattern 111A of the photosensitive pixel PX1C. That is, if the photosensitive pixels are sorted according to the capacitance values of the storage capacitors Cs, then in a descending order are the photosensitive pixel PX4C, the photosensitive pixel PX3C, the photosensitive pixel PX2C, and the photosensitive pixel PX1C.

Even though the quantum efficiency of the photosensitive pattern 130A of the photosensitive pixel PXCs for the different colored lights are different, the cross-pressure change amount generated at the two terminals of the storage capacitor Cs when the photosensitive pixel PXC is irradiated by the different colored lights is enabled to be controlled within the value range of the same degree through a magnitude relationship of the capacitance value of the storage capacitor Cs of the photosensitive pixels PXC. Accordingly, a sensing sensitivity difference of the photosensitive pixel PXCs for the different colored lights can be reduced, thereby improving the image sensing quality of the fingerprint sensing module 20.

Figure 13:
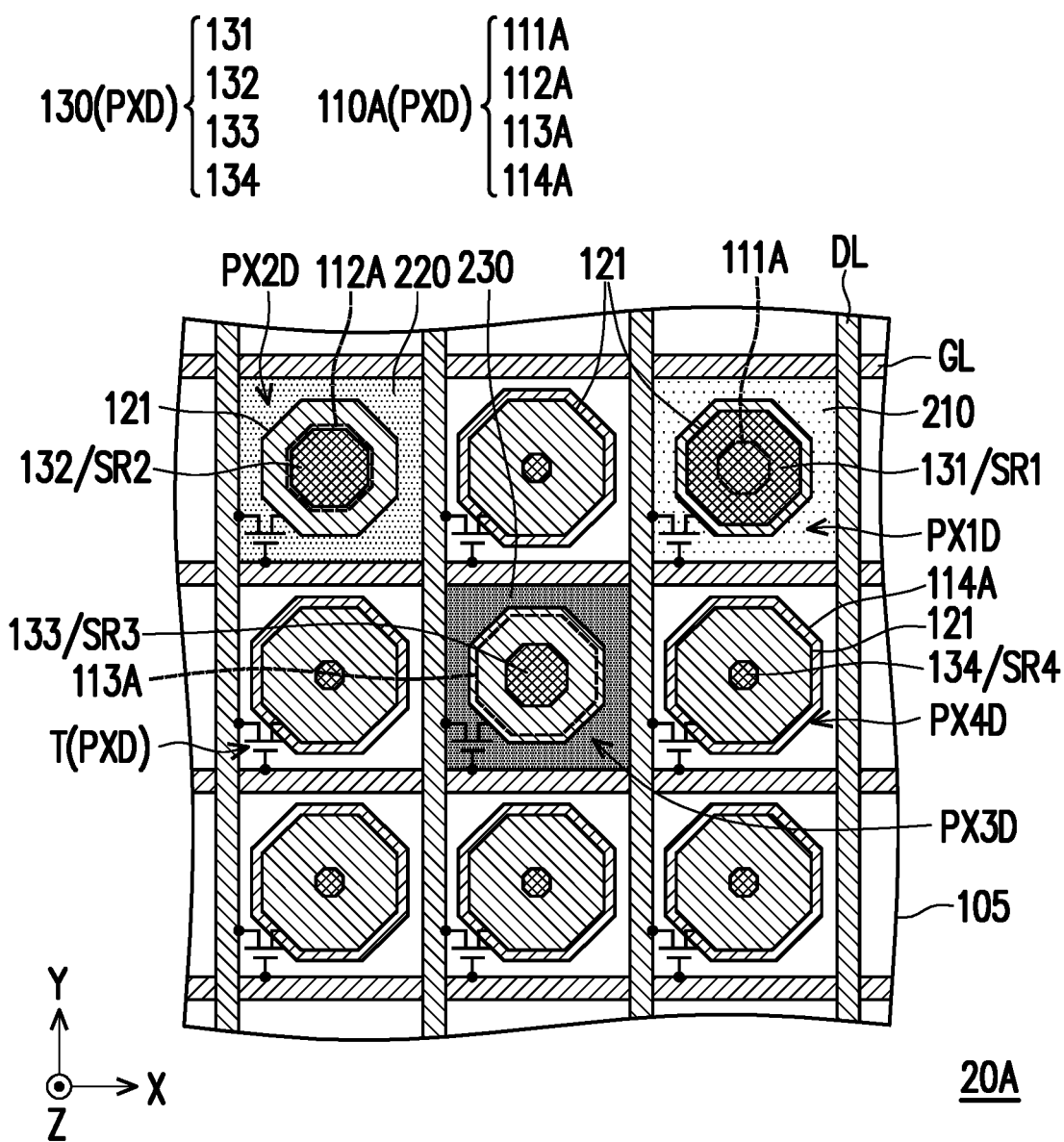
FIG. 13 is a schematic top view of a fingerprint sensing module according to a sixth embodiment of the disclosure.
Figure 14A:
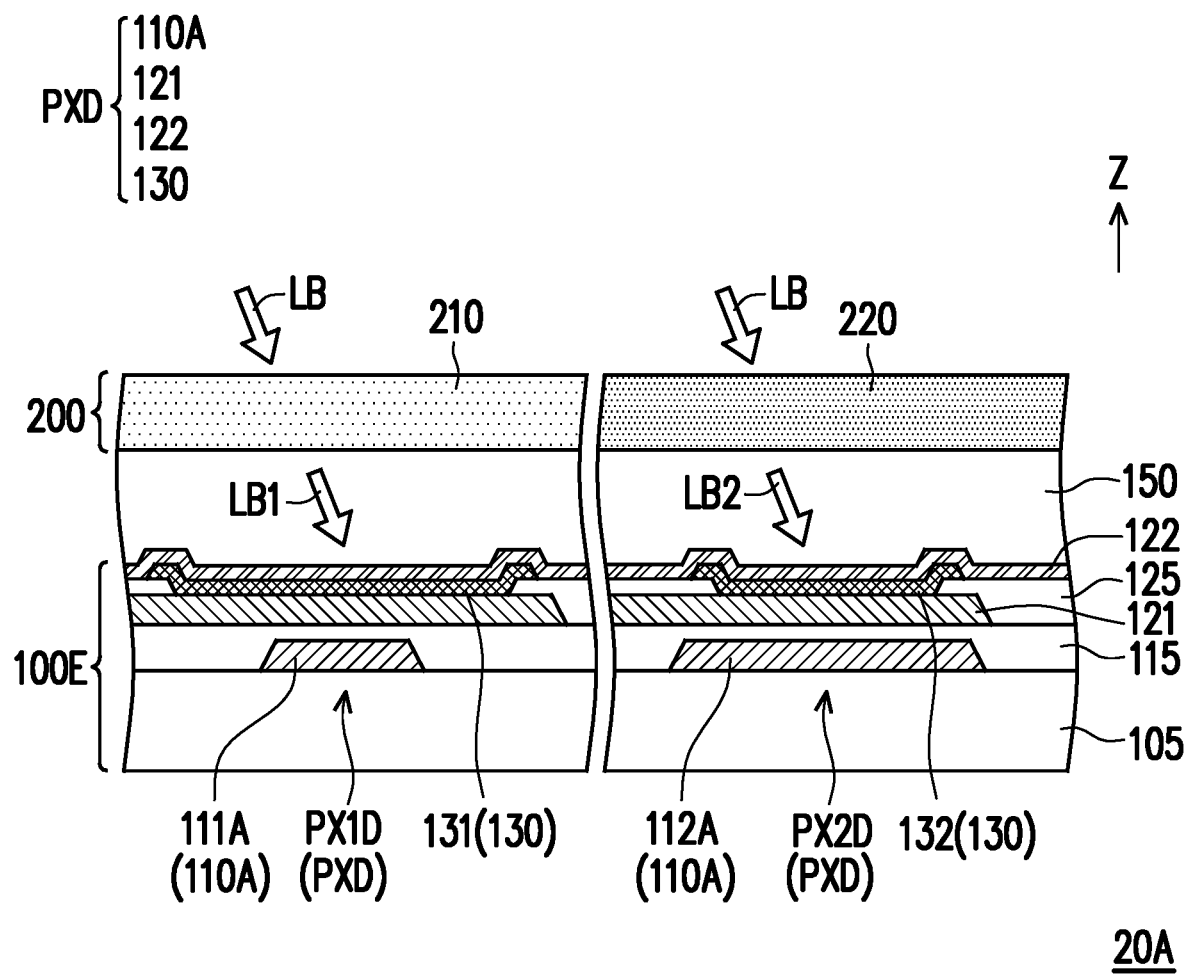
FIGS. 14A and 14B are schematic cross-sectional views of the fingerprint sensing module in FIG. 13.
Figure 14B:
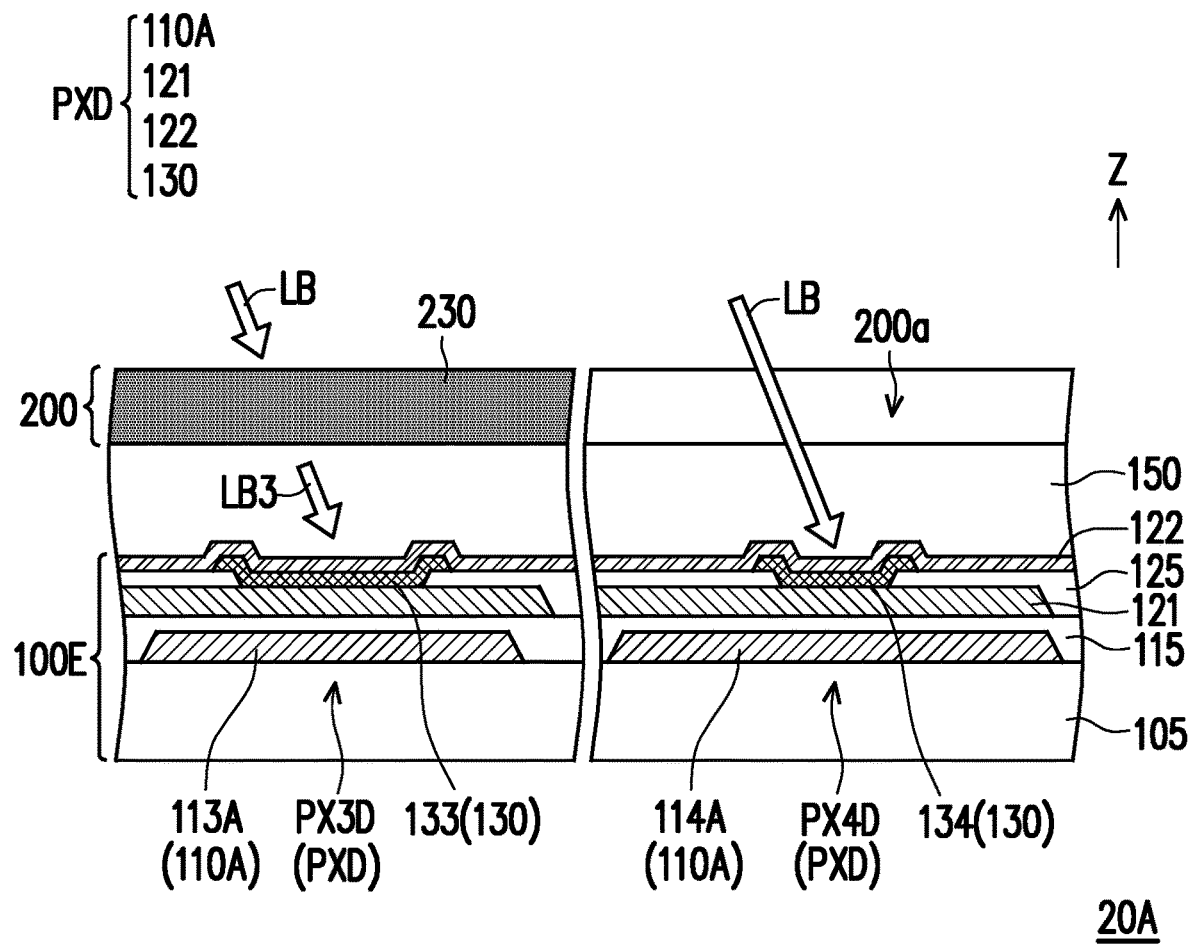
Figure 15:
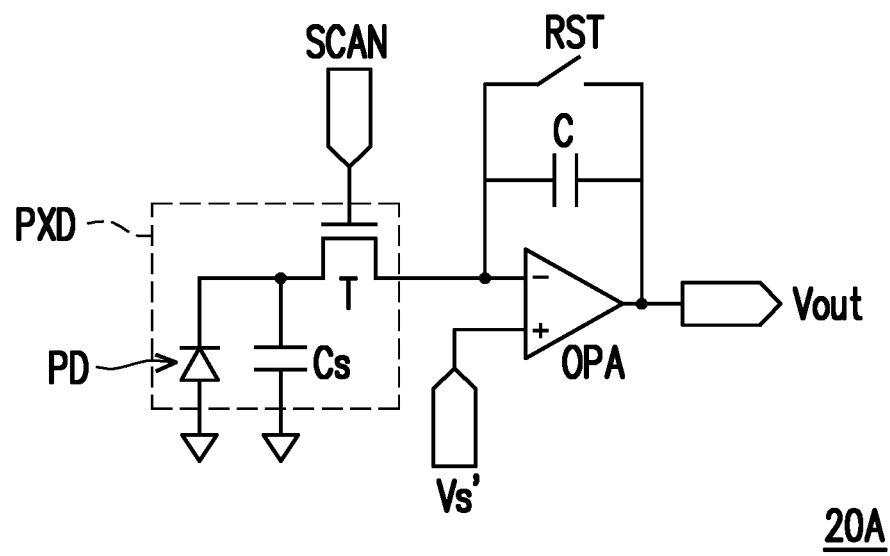
FIG. 15 is a schematic circuit view of the fingerprint sensing module in FIG. 13.

FIG. 13 is a schematic top view of a fingerprint sensing module according to a sixth embodiment of the disclosure. FIGS. 14A and 14B are schematic cross-sectional views of the fingerprint sensing module in FIG. 13. FIG. 15 is a schematic circuit view of the fingerprint sensing module in FIG. 13. For clarity of presentation, the illustrations of the insulation layer 115, the second electrode 122, and the insulation layer 150 in FIGS. 14A and 14B are omitted in FIG. 13.

With reference to FIGS. 13 to 15, a difference between a fingerprint sensing module 20A of the embodiment and the fingerprint sensing module 20 in FIG. 10 is that a photosensitive pixel PXD of the fingerprint sensing module 20A is a passive pixel sensor (PPS). Unlike the photosensitive pixel PXC of the fingerprint sensing module 20, the photosensitive pixel PXD of the embodiment only has the active element T. A gate of the active element T receives the gate driving signal SCAN, a source of the active element T is coupled to a terminal of the photosensitive element PD and a terminal of the storage capacitor Cs, a drain of the active element T is coupled to a signal conversion circuit, and another terminal of the photosensitive element PD and another terminal of the storage capacitor Cs are both grounded.

The signal conversion circuit may include an operational amplifier OPA, a capacitor C, and a reset switch RST. The drain of the active element T is coupled to an inverting input terminal of the operational amplifier OPA, and the capacitor C and the reset switch RST are connected between the inverting input terminal and an output terminal of the operational amplifier OPA. A non-inverting input terminal of the operational amplifier OPA receives a set voltage Vs', and the set voltage Vs' is, for example, a low voltage. The output terminal of the operational amplifier OPA outputs the voltage signal Vout.

In the embodiment, a size configuration of the respective photosensitive patterns 130 (that is, the photosensitive region) of a photosensitive pixel PX1D, a photosensitive pixel PX2D, a photosensitive pixel PX3D, and a photosensitive pixel PX4D of a photosensitive element layer 100E is similar to that of the photosensitive pixel PX1, the photosensitive pixel PX2, the photosensitive pixel PX3, and the photosensitive pixel PX4 of the photosensitive element layer 100 in FIG. 2. That is, if the four photosensitive pixels PX1D to PX4D of the embodiment are sorted according to size of the orthographic projection area of the respective photosensitive patterns 130 on the substrate 105, then in a descending order are the photosensitive pixel PX1D, the photosensitive pixel PX2D, the photosensitive pixel PX3D, and the photosensitive pixel PX4D.

Since the orthographic projection areas of the photosensitive patterns 130 of the four photosensitive pixels PX1D to PX4D on the substrate 105 are different, the capacitance values of the photosensitive element PD of the photosensitive pixels PX1D to PX4D are also different. In particular, if the capacitance value of the photosensitive element PD of the photosensitive pixel PXD is too large, a photocurrent generated by the photosensitive element PD when irradiated by a ray and the cross-pressure change amount generated at the two terminals of the storage capacitor Cs show a non-linear relationship, causing sensing sensitivity of the photosensitive element PD to the ray to be unstable. In order to prevent this issue, the orthographic projection areas of the respective conductive patterns 110A of the four photosensitive pixels PX1D to PX4D of the embodiment on the substrate 105 are different.

For example, the four photosensitive pixels PX1D to PX4D of this embodiment are sorted according to size of the orthographic projection areas of the respective conductive patterns 110A on the substrate 105, then in a descending order is the photosensitive pixel PX4D, the photosensitive pixel PX3D, the photosensitive pixel PX2D, and the photosensitive pixel PX1D. That is to say, a magnitude relationship of the conductive patterns of the photosensitive pixels PX1D to PX4D is opposite to the magnitude relationship of the photosensitive patterns 130 of the photosensitive pixels PX1D to PX4D. Since the photosensitive element PD of the photosensitive pixel PXD is connected in parallel to the storage capacitor Cs, an issue of unstable sensing sensitivity of the photosensitive pixel PXD due to an excessive capacitance value of the photosensitive element PD may be addressed through adjusting (such as reducing) the capacitance value of the storage capacitor Cs of the photosensitive pixel PXD.

Figure 16:
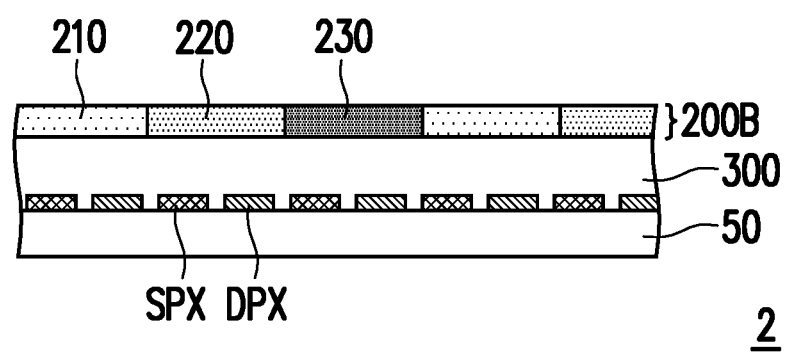
FIG. 16 is a schematic diagram of a fingerprint recognition device according to another embodiment of the disclosure.

FIG. 16 is a schematic view of a fingerprint recognition device according to another embodiment of the disclosure. With reference to FIG. 16, a difference between a fingerprint recognition device 2 of the embodiment and the fingerprint recognition device 1 in FIG. 1 is that configuration of the fingerprint sensing module is different. Specifically, in the embodiment, the display panel of the fingerprint recognition device 2 is, for example, a liquid crystal display panel, and the fingerprint sensing module is directly integrated into the liquid crystal display panel. That is, the fingerprint recognition device 2 of the embodiment is an in-cell fingerprint sensing display. For example, the liquid crystal display panel includes a pixel array substrate 50, a color filter layer 200B, and a liquid crystal layer 300. The liquid crystal layer 300 is disposed between the pixel array substrate 50 and the color filter layer 200B. It should be noted that display pixels DPX used for display and photosensitive pixels SPX used for light sensing are both disposed on the pixel array substrate 50.

In particular, the disclosure does not limit an integration manner of the fingerprint sensing module and the display panel. In other embodiments, the fingerprint sensing module may be disposed above the display panel, such as an on-screen fingerprint/image recognition device.

In summary, in the fingerprint sensing module according to the embodiment of the disclosure, the first photosensitive pixels and the second photosensitive pixels used to sense the different colored lights have a smaller difference in the sensing sensitivity due to the different sizes of their respective photosensitive regions or the different storage capacitance values. Accordingly, the image sensing quality of the fingerprint sensing module is improved.

Although the disclosure has been disclosed with the foregoing exemplary embodiments, it is not intended to limit the disclosure. Any person skilled in the art can make various changes and modifications within the spirit and scope of the disclosure. Accordingly, the scope of the disclosure is defined by the claims appended hereto and their equivalents.

What is claimed is:

1. A fingerprint sensing module, comprising:
a photosensitive element layer, comprising a plurality of photosensitive regions and comprising:
a substrate; and
a plurality of photosensitive pixels, disposed on the substrate and comprising a plurality of photosensitive patterns overlapping the plurality of photosensitive regions, wherein the plurality of photosensitive pixels comprise a plurality of first photosensitive pixels and a plurality of second photosensitive pixels, the plurality of first photosensitive pixels overlap a plurality of first photosensitive regions of the plurality of photosensitive regions, the plurality of second photosensitive pixels overlap a plurality of second photosensitive regions of the plurality of photosensitive regions, wherein a percentage value of a number of the plurality of second photosensitive pixels to a number of the plurality of photosensitive pixels is less than 30%, and an orthographic projection area of each of the plurality of first photosensitive regions on the substrate is different from an orthographic projection area of each of the plurality of second photosensitive regions on the substrate; and
a color filter layer, disposed on the photosensitive element layer, and the plurality of photosensitive pixels are located between the color filter layer and the substrate, wherein the color filter layer comprises a plurality of openings and a plurality of first color filter patterns, the plurality of openings respectively overlap the plurality of first photosensitive pixels, and the first color filter patterns respectively overlap the plurality of second photosensitive pixels.

2. The fingerprint sensing module according to claim 1, wherein quantum efficiency of the plurality of photosensitive patterns for a first colored light passing through the plurality of openings is different from quantum efficiency of the plurality of photosensitive patterns for a second colored light passing through the plurality of first color filter patterns.

3. The fingerprint sensing module according to claim 2, wherein the quantum efficiency of the plurality of photosensitive patterns for the first colored light is greater than the quantum efficiency of the plurality of photosensitive patterns for the second colored light, and the orthographic projection area of the each of the plurality of first photosensitive regions on the substrate is smaller than the orthographic projection area of the each of the plurality of second photosensitive region on the substrate.

4. The fingerprint sensing module according to claim 2, wherein the plurality of photosensitive pixels further comprise a plurality of third photosensitive pixels, the plurality of third photosensitive pixels overlap a plurality of third photosensitive regions of the photosensitive regions, a percentage value of a sum of numbers of the plurality of second photosensitive pixels and the plurality of third photosensitive pixels to the number of the plurality of photosensitive pixels is less than 30%, the color filter layer further comprises a plurality of second color filter patterns respectively overlapping the plurality of third photosensitive pixels, and quantum efficiency of the plurality of photosensitive patterns for a third colored light passing through the plurality of second color filter patterns is different from the quantum efficiency of the plurality of photosensitive patterns for the first colored light and the quantum efficiency of the plurality of photosensitive patterns for the second colored light.

5. The fingerprint sensing module according to claim 4, wherein the quantum efficiency of the plurality of photosensitive patterns for the first colored light is greater than the quantum efficiency of the plurality of photosensitive patterns for the second colored light, and the quantum efficiency of the plurality of photosensitive patterns for the second colored light is greater than the quantum efficiency of the plurality of photosensitive patterns for the third colored light, the orthographic projection area of the each of the plurality of first photosensitive regions on the substrate is smaller than the orthographic projection area of the each of the plurality of second photosensitive regions on the substrate, and the orthographic projection area of the each of the plurality of second photosensitive regions on the substrate is smaller than an orthographic projection area of each of the plurality of third photosensitive regions on the substrate.

6. The fingerprint sensing module according to claim 2, further comprising:
a light shielding pattern layer, disposed on the plurality of photosensitive patterns, and defining the plurality of photosensitive regions, wherein the light shielding pattern layer comprises a plurality of first openings and a plurality of second openings overlapping at least a portion of the plurality of photosensitive patterns, the plurality of first openings overlap the plurality of first photosensitive pixels, the plurality of second openings overlap the plurality of second photosensitive pixels, and an orthographic projection area of a region occupied by each of the plurality of first openings on the substrate is different from an orthographic projection area of a region occupied by each of the plurality of second openings on the substrate.

7. The fingerprint sensing module according to claim 6, wherein the quantum efficiency of the plurality of photosensitive patterns for the first colored light is greater than the quantum efficiency of the plurality of photosensitive patterns for the second colored light, and the orthographic projection area of the region occupied by the each of the plurality of first openings on the substrate is smaller than the orthographic projection area of the region occupied by the each of the plurality of second openings on the substrate.

8. The fingerprint sensing module according to claim 6, wherein an insulation layer is disposed between the light shielding pattern layer and the plurality of photosensitive patterns.

9. The fingerprint sensing module according to claim 1, wherein the plurality of first photosensitive pixels comprise a plurality of first photosensitive patterns in the plurality of photosensitive patterns, the plurality of second photosensitive pixels comprise a plurality of second photosensitive patterns in the plurality of photosensitive patterns, and an orthographic projection area of each of the plurality of first photosensitive patterns on the substrate is different from an orthographic projection area of each of the plurality of second photosensitive patterns on the substrate.

10. The fingerprint sensing module according to claim 9, wherein quantum efficiency of the plurality of photosensitive patterns for a first colored light passing through the plurality of openings is greater than quantum efficiency of the plurality of photosensitive patterns for a second colored light passing through the plurality of first color filter patterns, and the orthographic projection area of the each of the plurality of first photosensitive patterns on the substrate is smaller than the orthographic projection area of the each of the plurality of second photosensitive patterns on the substrate.

11. The fingerprint sensing module according to claim 1, wherein each of the plurality of photosensitive pixels further comprises a first electrode, a second electrode, and a conductive pattern, the first electrode and the second electrode are respectively disposed on two opposite sides of a corresponding photosensitive pattern and are electrically connected to the photosensitive pattern, the first electrode overlaps the conductive pattern and is located between the photosensitive pattern and the conductive pattern, the first electrode is electrically insulated from the conductive pattern, and an orthographic projection area of the conductive pattern of each of the plurality of first photosensitive pixels on the substrate is different from an orthographic projection area of the conductive pattern of each of the plurality of second photosensitive pixels on the substrate.

12. The fingerprint sensing module according to claim 11, wherein quantum efficiency of the plurality of photosensitive patterns for a first colored light passing through the plurality of openings is greater than quantum efficiency of the plurality of photosensitive patterns for a second colored light passing through the plurality of first color filter patterns, and the orthographic projection area of the conductive pattern of the each of the plurality of first photosensitive pixels on the substrate is larger than the orthographic projection area of the conductive pattern of the each of the plurality of second photosensitive pixels on the substrate.

13. The fingerprint sensing module according to claim 12, wherein the orthographic projection area of the each of the plurality of first photosensitive regions on the substrate is smaller than the orthographic projection area of the each of the plurality of second photosensitive regions on the substrate.

14. The fingerprint sensing module according to claim 1, further comprising:
a plurality of infrared light cut-off filter patterns, disposed in the plurality of openings of the color filter layer and respectively overlapping the plurality of first photosensitive pixels.

15. A fingerprint sensing module, comprising:
a photosensitive element layer, comprising a plurality of photosensitive regions and comprising:
a substrate; and
a plurality of photosensitive pixels, disposed on the substrate, and each of the plurality of photosensitive pixels comprises a photosensitive pattern, a first electrode, a second electrode, and a conductive pattern overlapping one of the plurality of photosensitive regions, wherein the first electrode and the second electrode are respectively disposed on two opposite sides of the photosensitive pattern and are electrically connected to the photosensitive pattern, the first electrode is located between the photosensitive pattern and the conductive pattern, and overlaps the conductive pattern to form a storage capacitor, and the plurality of photosensitive pixels comprise a plurality of first photosensitive pixels and a plurality of second photosensitive pixels; and
a color filter layer, disposed on the photosensitive element layer, and the plurality of photosensitive pixels are located between the color filter layer and the substrate, wherein the color filter layer comprises a plurality of openings and a plurality of first color filter patterns, the plurality of openings respectively overlap the plurality of first photosensitive pixels, and the first color filter patterns respectively overlap the plurality of second photosensitive pixels,
wherein quantum efficiency of the plurality of photosensitive patterns for a first colored light passing through the plurality of openings is different from quantum efficiency of the plurality of photosensitive patterns for a second colored light passing through the plurality of first color filter patterns, and an orthographic projection area of the conductive pattern of each of the plurality of first photosensitive pixels on the substrate is different from an orthographic projection area of the conductive pattern of each of the plurality of second photosensitive pixels on the substrate.

16. The fingerprint sensing module according to claim 15, wherein the quantum efficiency of the plurality of photosensitive patterns for the first colored light is greater than the quantum efficiency of the plurality of photosensitive patterns for the second colored light, and the orthographic projection area of the conductive pattern of the each of the plurality of first photosensitive pixels on the substrate is larger than the orthographic projection area of the conductive pattern of the each of the plurality of second photosensitive pixels on the substrate, the plurality of photosensitive regions comprise a plurality of first photosensitive regions overlapping the plurality of first photosensitive pixels and a plurality of second photosensitive regions overlapping the plurality of second photosensitive pixels, and an orthographic projection area of each of the plurality of first photosensitive regions on the substrate is equal to an orthographic projection area of each of the plurality of second photosensitive regions on the substrate.

17. The fingerprint sensing module according to claim 15, wherein the plurality of photosensitive regions comprise a plurality of first photosensitive regions overlapping the plurality of first photosensitive pixels and a plurality of second photosensitive regions overlapping the plurality of second photosensitive pixels, and an orthographic projection area of each of the plurality of first photosensitive regions on the substrate is different from an orthographic projection area of each of the plurality of second photosensitive regions on the substrate.

18. The fingerprint sensing module according to claim 17, wherein the quantum efficiency of the plurality of photosensitive patterns for the first colored light is greater than the quantum efficiency of the plurality of photosensitive patterns for the second colored light, and the orthographic projection area of the each of the plurality of first photosensitive regions on the substrate is smaller than the orthographic projection area of the each of the plurality of second photosensitive regions on the substrate, and the orthographic projection area of the conductive pattern of the each of the plurality of first photosensitive pixels on the substrate is larger than the orthographic projection area of the conductive pattern of the each of the plurality of second photosensitive pixels on the substrate.

19. The fingerprint sensing module according to claim 15, wherein a percentage value of a number of the plurality of second photosensitive pixels to a number of the plurality of photosensitive pixels is less than 30%.

20. The fingerprint sensing module according to claim 15, further comprising:

a plurality of infrared light cut-off filter patterns, disposed in the plurality of openings of the color filter layer and respectively overlapping the plurality of first photosensitive pixels.

* * * * *